(12) United States Patent  
Howard

(10) Patent No.: US 8,959,494 B2
(45) Date of Patent: Feb. 17, 2015

(54) PARALLELISM FROM FUNCTIONAL DECOMPOSITION

(75) Inventor: Kevin D. Howard, Tempe, AZ (US)

(73) Assignee: Massively Parallel Technologies Inc., Boulder, CO (US)

(*) Notice: Subject to any disclaimer, the term of this patent is extended or adjusted under 35 U.S.C. 154(b) by 393 days.

(21) Appl. No.: 13/425,136

(22) Filed: Mar. 20, 2012

(65) Prior Publication Data

US 2013/0254751 A1    Sep. 26, 2013

(51) Int. Cl.
G06F 9/45    (2006.01)

(52) U.S. Cl.
USPC .......................................................... 717/144

(58) Field of Classification Search
USPC .......... 717/100, 106, 140, 144; 703/3, 14, 15; 716/102–106; 709/218; 370/392; 719/318; 715/771
See application file for complete search history.

(56) References Cited

U.S. PATENT DOCUMENTS

| | | | |
|---|---|---|---|
| 5,430,873 A | 7/1995 | Abe et al. | |
| 5,774,370 A * | 6/1998 | Giomi | 716/105 |
| 6,201,492 B1 * | 3/2001 | Amar et al. | 341/155 |
| 6,718,533 B1 * | 4/2004 | Schneider et al. | 717/100 |
| 7,162,710 B1 | 1/2007 | Edwards et al. | |
| 2003/0079188 A1 | 4/2003 | McConaghy et al. | |
| 2003/0140332 A1 | 7/2003 | Norton et al. | |
| 2003/0149968 A1 | 8/2003 | Imai | |
| 2003/0216901 A1 * | 11/2003 | Schaumont et al. | 703/13 |
| 2004/0015775 A1 | 1/2004 | Simske et al. | |
| 2006/0015858 A1 * | 1/2006 | Tanimoto et al. | 717/140 |
| 2006/0020949 A1 | 1/2006 | Hoshino et al. | |
| 2006/0136850 A1 | 6/2006 | Corbeil, Jr. et al. | |
| 2006/0155526 A1 * | 7/2006 | Castillo et al. | 704/1 |
| 2007/0294578 A1 | 12/2007 | Qiao et al. | |
| 2008/0071801 A1 * | 3/2008 | Lucco et al. | 707/100 |
| 2008/0263506 A1 | 10/2008 | Broadfoot et al. | |
| 2008/0307267 A1 | 12/2008 | Chandrasekaran | |
| 2009/0077483 A9 * | 3/2009 | Howard et al. | 715/771 |
| 2009/0119484 A1 | 5/2009 | Mohl et al. | |
| 2009/0241106 A1 | 9/2009 | Andersen | |
| 2009/0265696 A1 | 10/2009 | Grice | |
| 2010/0153908 A1 | 6/2010 | Sarkar et al. | |
| 2011/0283095 A1 | 11/2011 | Hall et al. | |

(Continued)

FOREIGN PATENT DOCUMENTS

JP    2010097426 A    4/2010
WO    2007104158 A1    9/2007

OTHER PUBLICATIONS

Bilung Lee, "Fusing DataFlow with Finite State Machines", pp. 1-28, May 1996 <DFD_FSM96.pdf>.*

(Continued)

Primary Examiner — Tuan A Vu
(74) Attorney, Agent, or Firm — Lathrop & Gage LLP

(57) ABSTRACT

A system and method for performing functional decomposition of a software design to generate a computer-executable finite state machine. Initially, the software design is received in a form wherein functions in the software design are repetitively decomposed into (1) data and control transformations. Included between the functions are control flow indicators which have transformation-selection conditions associated therewith. The data transformations and the control transformations are translated into states in the finite state machine. The transformation-selection conditions associated with the control transformations are translated into state transitions in the finite state machine.

48 Claims, 38 Drawing Sheets

(56) References Cited

U.S. PATENT DOCUMENTS

2012/0066664 A1 3/2012 Howard
2012/0101929 A1 4/2012 Howard

OTHER PUBLICATIONS

PCT Application PCT/US2013/033125 International Search Report and Written Opinion, dated Jun. 27, 2013, 8 pages.
PCT Application PCT/US2013/044573 International Search Report and Written Opinion dated Jul. 22, 2013, 8 pages.
Ward, et al., "Structured Development for Real Time Systems," vol. 1: Introduction & Tools, Published by Prentice-Hall, Inc., 1985.
U.S. Appl. No. 13/490,345 Office Action issued Aug. 30, 2013, 16 pages.
U.S. Appl. No. 13/490,345 Response to Office Action filed Dec. 2, 2013, 10 pages.
U.S. Appl. No. 13/490,345 Notice of Allowance issued Feb. 3, 2014, 27 pages.
PCT Application PCT/US2013/044818 International Search Report and Written Opinion dated Sep. 13, 2013, 9 pages.
Yourdon, "Modern Structured Analysis," Published by PTR Prentice Hall 1989, pp. Intro to 189.
Yourdon, "Modern Structured Analysis," Published by PTR Prentice Hall 1989, pp. 190-400.
Yourdon, "Modern Structured Analysis," Published by PTR Prentice Hall 1989, pp. 401-667.

* cited by examiner

PARALLELISM FROM FUNCTIONAL DECOMPOSITION

BACKGROUND

Traditional models for functional decomposition of algorithms are vague in their definition of lower decomposition levels. In the Yourdon structured model, control transformations decompose into state transition diagrams which represent the real-time aspects of the system. Although control transformations were used by Yourdon, Ward and Millor, and Hatley and Pirbhai to define real-time control transformation events, their definition of control transformation does not include any of the following types of software statements: goto, if-then-else, switch loops, and subroutine calls.

If the transformations decompose from the highest to the lower levels, but the complexity is not constrained by the developer as the functionality decomposes, as in the McCabe model, the amount of control is unconstrained, and it is not clear when the decomposition should end. Furthermore, since the unconstrained decomposition does not inherently simplify the design, it does not actually meet the criteria of mathematical functional decomposition.

SOLUTION

To eliminate the above-noted shortcomings of previous decomposition methods, a simple graph, created in accordance with the multiprocessor functional decomposition (MPfd) model described herein, is constrained to a single control structure per decomposition level and exposes all transitions, preparing the graph for translation into a finite state machine (FSM).

Traditionally, FSMs have been used to create compilers and have also been used in sequential circuit design. Being able to use FSMs in general software design and thus in general programming offers huge benefits for general programming including increased software clarity and the ability better combine computer software with computer hardware.

Disclosed herein are a system and method for performing functional decomposition of a software design to generate a computer-executable finite state machine. Initially, the software design is received in a form wherein functions in the software design are repetitively decomposed into (1) data and control transformations. Included between the functions are control flow indicators which have transformation-selection conditions associated therewith. The data transformations and the control transformations are translated into states in the finite state machine. The transformation-selection conditions associated with the control transformations are translated into state transitions in the finite state machine.

DETAILED DESCRIPTION

Figure 1:
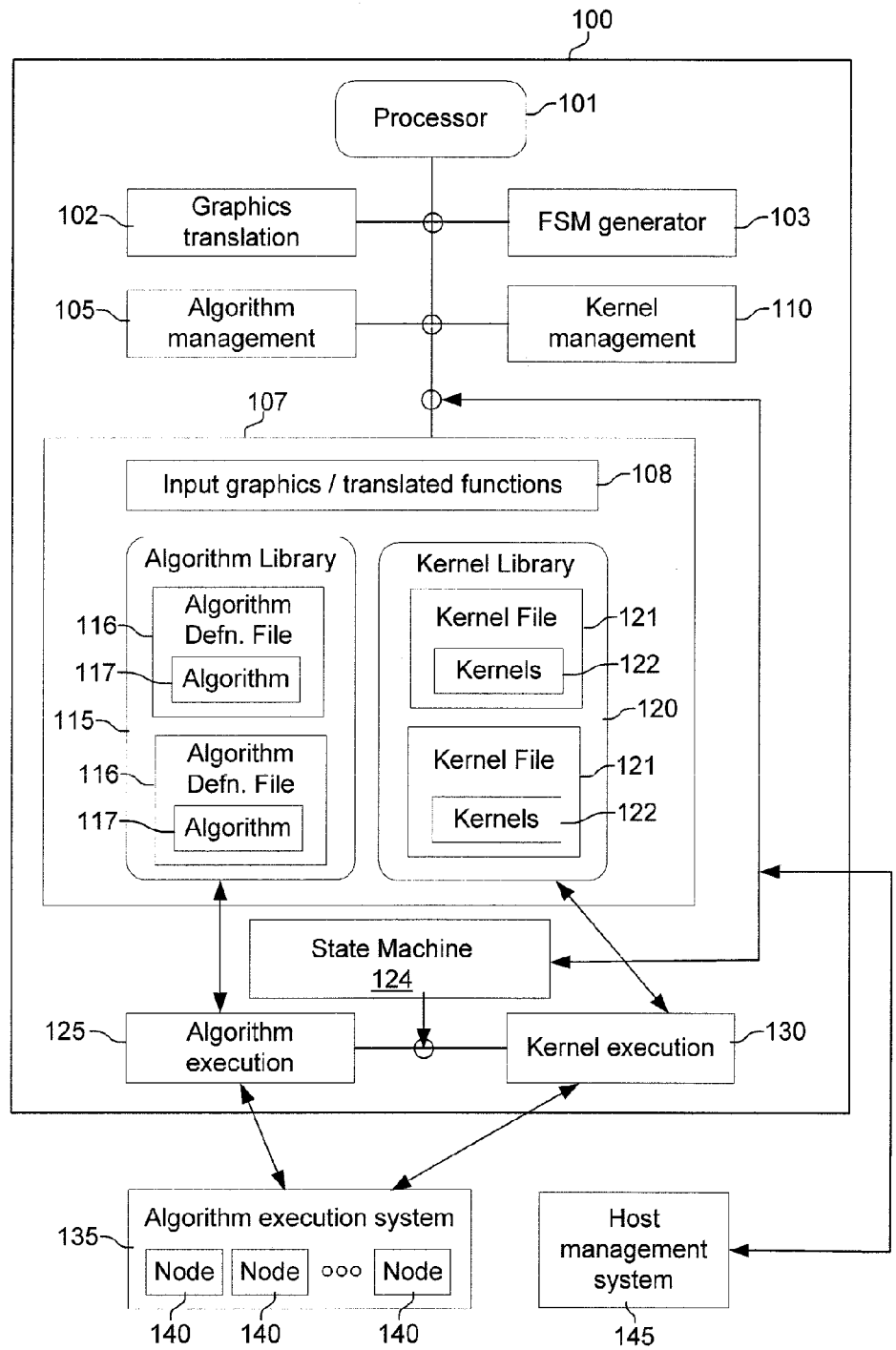
FIG. 1 is a system diagram showing an exemplary computing environment in which the present system functions.

Although functional decomposition has long been used to design software, the multiprocessor functional decomposition (MPfd) techniques and methods described herein extend beyond mere design. First, any design created using the presently described MPfd methods can, by definition, be translated directly into a finite state machine (FSM). Since field programmable gate arrays (FPGAs) and graphical processing units (GPUs) use FSMs in their programming, the MPfd is useful in creating not only CPU but GPU and FPGA codes as well. Second, incorrect MPfd structures can be automatically detected and corrected. Third, MPfd techniques incorporate the automatic selection of the pass-by-value or the pass-by-reference data movement model for moving data between functional elements. This allows the presently-described system to combine computer languages like "C" and "C++" with other computer languages like Fortran or Java. Fourth, MPfd elements are annotated with information concerning the use of any data, not just the data type. Using the MPfd model to automatically find task-level and non-task-level parallelism from design, instead of the user finding it within the code, allows separate compute threads to simultaneously process data.

Since a task in the present system is equivalent to one or more data transformations (or simply "transformations") and since a transformation is a state in the present finite state machine (FSM), showing which states can be executed in parallel is equivalent to indicating the task parallelism.

Definitions

For the purpose of this document, the following definitions are supplied to provide guidelines for interpretation of the terms below as used herein:

Function—a software routine, or more simply an algorithm that performs one or more transformations.

Control Kernel—A control kernel is a software routine or function that contains only the following types of computer-language constructs: subroutine calls, looping statements (for, while, do, etc.), decision statements (if-then-else, etc.), and branching statements (goto, jump, continue, exit, etc.).

Process Kernel—A process kernel is a software routine or function that does not contain the following types of computer-language constructs: subroutine calls, looping statements, decision statements, or branching statements. Information is passed to and from a process kernel via RAM.

State Machine—The state machine employed herein is a two-dimensional network which links together all associated control kernels into a single non-language construct that provides for the activation of process kernels in the correct order. The process kernels form the "states" of the state-machine while the activation of those states form the state transition. This eliminates the need for software linker-loaders.

State Machine Interpreter—for the purpose of the present document, a State Machine Interpreter is a method whereby the states and state transitions of a state machine are used as active software, rather than as documentation.

Node—A node is a processing element comprised of a processing core, or processor, memory and communication capability.

Data transformation—A data transformation is a task that accepts data as input and transforms the data to generate output data.

Control transformation—A control transformation evaluates conditions and sends and receives control to/from other control transformations and/or data transformations.

Control bubble—A control bubble is a graphical indicator of a control transformation. A control bubble symbol indicates a structure that performs only transitions and does not perform processing.

Process bubble—A process bubble is a graphical indicator of a data transformation.

Finite state machine—A finite state machine is an executable program constructed from the linear code blocks resulting from transformations, where the transformation-selection conditions are state transitions constructed from the control flow.

Computing Environment

FIG. 1 is an exemplary diagram of the computing environment in which the present system and method operates. As shown in FIG. 1, system 100 includes a processor 101 which executes tasks and programs including a kernel management module 110, an algorithm management module 105, state machine 124, a kernel execution module 130, and an algorithm execution module 125. System 100 further includes storage 107, in which is stored data including libraries 115/120 which respectively store algorithms 117 and kernels 122. Storage 107 may be RAM, or a combination of RAM and other storage such as a disk drive. Module 102 performs a translation of a graphical input functional decomposition diagram 700 (see, e.g., FIG. 7) to corresponding MPfd functions (ultimately, states in a state machine), and stores the translated functions in appropriate libraries in storage area 108. Module 103 generates appropriate FSMs from the translated functions.

System 100 is coupled to a host management system 145, which provides management of system functions, and issues system requests. Algorithm execution module 125 initiates execution of kernels invoked by algorithms that are executed. Algorithm execution system 135 may comprise any computing system with multiple computing nodes 140 which can execute kernels stored in system 100. Management system 145 can be any external client computer system which requests services from the present system 100. These services include requesting that kernels or algorithms be added/changed/deleted from a respective library within the current system. In addition, the external client system can request that a kernel/algorithm be executed. It should be noted that the present system is not limited to the specific file names, formats and instructions presented herein.

A kernel is an executable computer program or program segment that contains data transformation/data code, and no program execution control code, where execution control code is any code that can change which code is to be executed next. In the exemplary embodiment described herein, kernels 122 are stored in a kernel library file 121 in kernel library 120.

An algorithm is a state machine that comprises states (kernel invocations) and state transitions (the conditions needed to go from one state to another). References to the "system" in this section refer in general to system 100, and in applicable embodiments, to algorithm management module 105. Each algorithm 117 is kept in an algorithm definition file 116 in algorithm library 115 with a name (Algorithm_Title) that is the concatenation of the organization name, the category name, algorithm name, and user name with a "_" character between each of the names.

Algorithm Definition File with Task Parallelism Example:
StateNumber[(state1, . . . state n), state x, state y, state z)], KernelID(nodeInfo)(InputDatasets)(OutputDatasets)(Transitions)(Loops)

In the above example, the parallel tasks are executed at the same time as "StateNumber".

Functional Decomposition

A control transformation evaluates conditions and sends and receives control. One primary difference between the Yourdon model and the present MPfd model is in how control transformations are handled. MPfd allows a control transformation to contain non-event control items. Non-event control items are conditions that change the sequence of execution of a program (if-then-else, go to, function calls, function returns), and a condition is a regular conditional expression.

Variables used by a control transformation can only be used in a condition; they cannot be transformed into any other value. An Invoke instruction initiates system operation; variables and constants are used in conditions to transition to a control transformation; and a Return instruction gives control back to the control transformation with the name of the returning routine. A control transformation can have only one selection condition per transformation, and there can be, at most, one control transformation per decomposition level.

The MPfd model creates hierarchical finite state machines (HFSM) whose state transitions have conditions and whose states are data transformations and control transformations. Data transformations can always, eventually, be associated with linear code blocks, while control transformations contain only transitions with no associated code blocks.

Data transformations represent the parallelizable portion of the software design. In MPfd designs, there are three data transformation types: associated, unassociated, and ambiguous. These types are concerned with the relationship between an upper-level transformation and its immediate next-level decomposition.

Associated transformations are grouped together and share data and/or control. Unassociated transformations are grouped together but share no data or control. Unassociated transformations can be executed in parallel. This is called task-level parallelization. Ambiguous transformations can always be converted to either associated or unassociated forms.

A data transformation can contain three types of looping structures: pre-work, post-work and recursion. Pre-work means that the loop-ending condition is checked prior to performing the work and is denoted by a downward-pointing solid-loop symbol on a transformation. Post-work means that the loop-ending condition is checked after performing the work and is denoted by an upward-pointing solid-loop symbol on a transformation. Recursion means that the transformation calls itself and is denoted by a downward-pointing dashed-loop symbol on a transformation.

In the Yourdon model, only the control transformation decomposes into a finite state machine (FSM). In an MPfd design, the entire diagram of the current decomposition level is converted into an FSM.

The lowest level of transformation decomposition represents a linear code block. Decomposition ends when a data transformation cannot decompose into a set of data transformations grouped together with a control transformation or when the decomposition results in the same graph as the decomposed transformation.

$$y=f(a,b,c,\ldots)=g(h_1(h_2(a,b),c),h_3(d,h_4(e),f),\ldots, h_n(a,b,c,\ldots))$$
Equation 1 Mathematics of Functional Decomposition In the example of Equation 1 above, the "hx( )" functions can also be decomposed, and this decomposition can continue. In standard decomposition, there is no specified last decomposition. In an MPfd, the decomposition continues until only a series of function calls depicting the structure of the function remains. A final decomposition then occurs when there are no function calls, and only a single data transformation remains. At that point, the decomposition has progressed to the kernel level, with the non-transformation functions equivalent to control kernels and the transformation-only functions equivalent to process kernels. By its nature, an MPfd forms a disjoint, fully reduced set of functions.

Function Dependencies

Transforming a function into its decomposed equivalent set of functions means hierarchically identifying functions within functions such that the equivalent functionality of the original function is maintained while the complexity of the component functions simplifies. This can be illustrated using the "g( )" function from Equation 1. The function g(h1(h2(a, b), c), h3(d, h4(e)), . . . hn (a, b, c, d, e, f)) uses the various "hx( )" functions as its parameters. The "hx( )" functions can, thus, be ordered by the "g( )" function in the same way as variables are ordered within a function. If some or all of the "hx( )" functions were also decomposed, they would have the decomposed functions as additional parameters. Unfortunately, the standard decomposition diagram notation does not make this functional ordering fully visible; that is, usually, the ordering is bound in the mathematics of "g( )".

Figure 2:
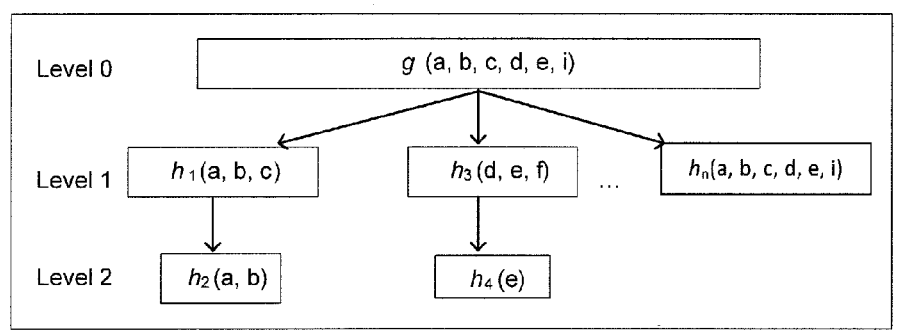
FIG. 2 is a prior art standard functional decomposition diagram.

The standard view of the functional ordering of decomposed functions "g( )" might give is shown in FIG. 2, which is a diagram showing a standard, prior art, functional decomposition. The function-order arrows (control flow indicators) on the standard functional decomposition diagram of FIG. 2 indicate the calling order of the functions. This calling order comes from a combination of the decomposition level (indicated by the level number shown on the diagram) and the parameter order of the functions as shown in FIG. 2. If the parameters used by some functions are different from those used by some other functions, those disjoint functions can be executed in parallel. The functions that share the same parameters are said to be joint and are executed serially.

In order to create different joint execution streams, in accordance with the present MPfd model, each function in a particular algorithm receives an execution-stream identifier. In the present exemplary embodiment, this execution-stream identifier is represented as a program thread. Graphically illustrated, this MPfd-type decomposition takes the form shown in the diagram of FIG. 3, which shows multiple threads from decomposition of a function with dissimilar parameters. By examining FIG. 3, it can be seen that thread 1 is used to coordinate the parallel execution of threads 2 and 3. In threads 2 and 3, the thread-sharing functions share variables and are linear to each other, but it is clear that threads 2 and 3 do not share data. Since there are no linear dependencies between thread 2 and thread 3 and no shared data, the two threads can be executed simultaneously.

Conditions for Transition

In a standard functional decomposition diagram, the function-order arrows contain no information other than indicating a general relationship. In the present system, a condition is added to the function-order arrows and this additional information can be used to identify additional parallelism. The MPfd control flow indicators each comprise a function-order arrow plus an associated condition. Adding function-calling or transition information to a function-order arrow is a way to graphically depict the circumstances under which a function is called; that is, it shows the underlying logical/mathematical rationale for transitioning to another function. For example, separate threads containing functions with the same parameters can be identified if their transition conditions are different, as shown on FIG. 4, which shows an example of functional decomposition with transition conditions and threads.

Figure 4:
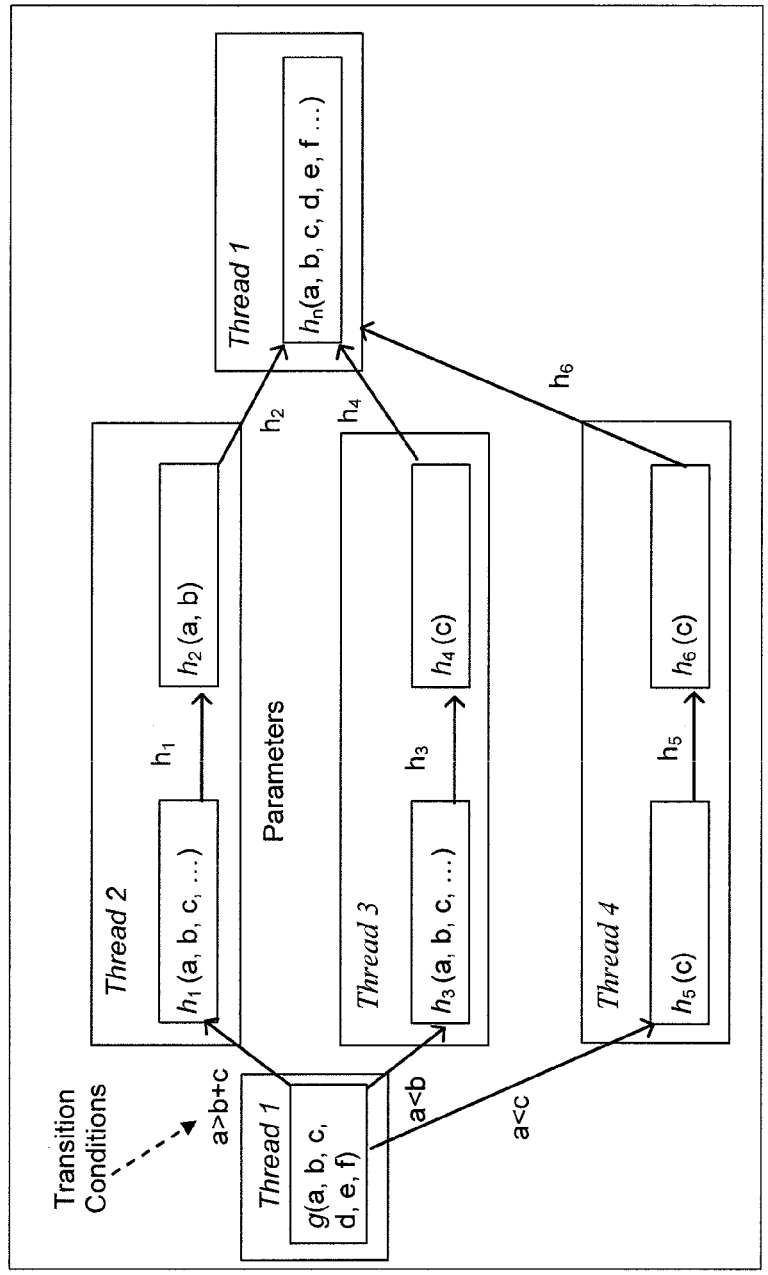
FIG. 4 shows an example of functional decomposition with transition conditions and threads.

When the various function-order arrows indicate the transition conditions, they can be thought of as state-transition vectors. If one ignores the variables, the called functions can be thought of as states. Note that the transitions shown in FIG. 4 are of two types: conditional from calculation, and conditional because a particular function has completed. Both types are necessary.

Multiple Threads as Nested Finite State Machines

Since parameters are a part of the function, they can be considered part of the state. Thus, the present functional decomposition with conditions and threads is functionally equivalent to a finite state machine. Furthermore, since each thread is separate from all other threads and each thread consists only of states and transitions, the threads act as their own state machines. Finally, since the threads are hierarchically formed, they depict nested finite-state machines.

Loops

As previously indicated, function transitions containing one of two types of transition conditions are required to externalize the control elements of functions, allowing them to be gathered together as threads. It is also clear that the transition is a separate entity type from the functions themselves. Loops or looping structures can be thought of as special, more generalized cases of function transition. Whereas a function transition contains only a condition, a looping structure contains a loop order, an initial loop-index value, a loop-index change calculation, and a loop-ending calculation.

Figure 5:
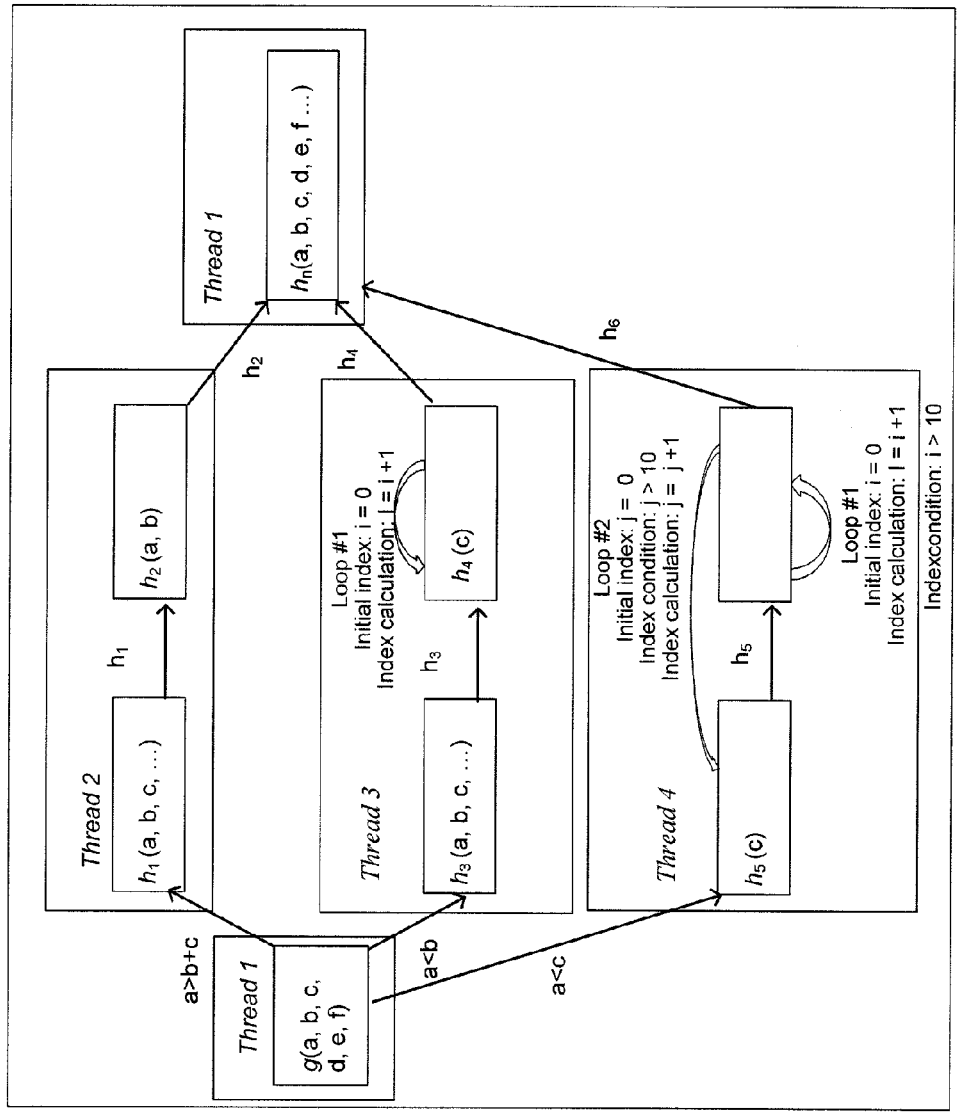
FIG. 5 shows an example of functional decomposition with conditions, threads and added loops.

FIG. 5 shows an exemplary functional decomposition with conditions, threads and added loops. The example in FIG. 5 shows three loops: a single loop for a specific function, an outer loop across functions, and an inner loop. The loop across functions can be used to loop at the thread level. An inner loop, indicated by having the lowest number in a multiple-loop system, is incremented first with subsequent numbers then incremented in successive order. It should be noted that it is not possible to loop between threads.

Functional Decomposition Graphical Model

At this point, the ideas of the prior sections are manually incorporated into a simple graphical model (e.g., a functional decomposition diagram 700, described below with respect to FIG. 7, et. seq.) that insures that all of the transitions are exposed. The functional decomposition diagram 700 is then input into graphics storage 108, and translated via graphics translation module 102 into corresponding functions in accordance with the MPfd decomposition methods described herein. The translated functions may be stored in memory area 108.

It should be noted that a looping structure can be attached to any decomposition element. This looping structure initializes some data element (variable, array element, or matrix element), performs a calculation on the data element, tests the changed element value for the ending condition, and then transitions to the next functional decomposition element required if the condition is met. The data element used as the loop index is one of the function parameters, allowing the looping structure to interact with the functional element.

Highest Level of Decomposition

Figure 6:
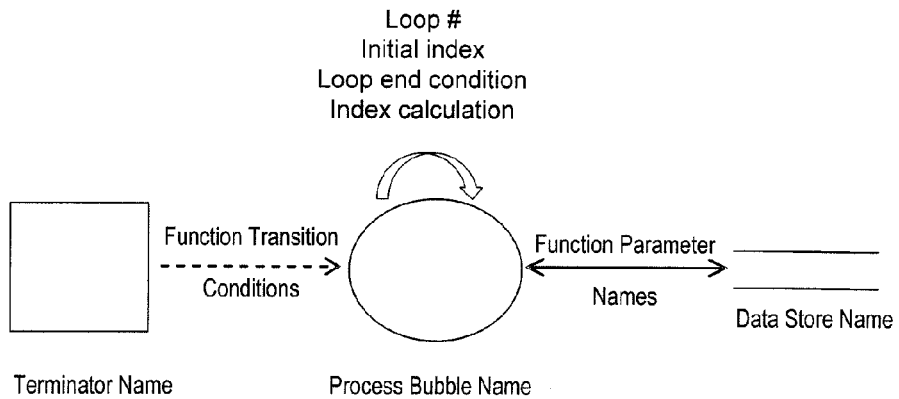
FIG. 6 is an example illustrating the highest level decomposition (level 0).

Level 0 of the MPfd consists of only three types of objects: (1) terminators, (2) a single-process bubble (or other indicator) corresponding to the un-decomposed function, and (3) data stores, along with function transitions, loops, and function parameters. The purpose of the highest level of decomposition is to place a function into a larger context. This is accomplished by allowing systems that are external to the function to transmit data and control to/from the function. A terminator represents a complete external system. FIG. 6 shows an example of the highest level (level-0) decomposition. The "Function Transition Conditions" of FIG. 6 correspond to the "Transition Conditions" shown in FIG. 4. The "Process Bubble Name" of FIG. 6 corresponds to function "g( )" of Equation 1 and FIGS. 2-5. The "Function Parameter Names" of FIG. 6 correspond to the parameters shown in Equation 1 and FIGS. 2-5.

Terminators

A terminator may be represented as a labeled square. The purpose of terminators is to be able to identify interfaces to outside systems. These interfaces do not correspond to any mathematical functions but instead represent access to data outside of the un-decomposed function. A terminator can be used to represent anything from another computer system to a display screen. Functionally, a terminator behaves similarly to a data store in that data can be sent from/to the terminator from/to the un-decomposed function. The difference between a terminator and a data store is that a terminator can transition from/to the un-decomposed function.

Process Bubble

A process bubble, adds data, changes data, deletes data, or moves data. Since a process-bubble manipulates data, all activities associated with sending and receiving data to various stores is allowed. Furthermore, since a data element can also serve as a signal, activities associated with various signals are also allowed. A process bubble, as employed in the MPfd model, is a graphical indicator of a data transformation, which is a task that accepts input data and transforms it to generate output data.

Exemplary Allowed Process Bubble Activities
1) send data to a data store using output dataflow
2) receive data from a data store using input dataflow
3) Send standard signals to control-bubbles
4) Receive standard signals from control-bubbles
5) Send standard signals to terminators
6) Receive standard signals from terminators
7) Send data to terminators
8) Receive data from terminators Single-Process Bubble The single-process bubble of the highest level of decomposition represents the un-decomposed function. Since the function is not decomposed, there can be only one level-0 process bubble. It is assumed that the level-0 process bubble will be decomposed into other functions.

Data Stores

A function typically transforms data. One way to graphically depict the transmission of data from/to the single-process bubble is via a terminator. Another way is with a data store. The displayed data stores can send/receive parameter data to/from the single-process bubble.

Control Bubble

A control bubble is a graphical indicator of a control transformation, which evaluates conditions and sends and receives control to/from other control transformations and/or data transformations. A control bubble symbol indicates a structure that performs only transitions that control the processing flow of a system, and which does not perform processing.

Conversion of MPFD to Finite State Machine

A primary goal of functional decomposition is the conversion of an MPfd into a finite state machine. This conversion is enabled by adhering to the following rules:
1) There can be only one control bubble at each decomposition level.
2) Only a control bubble can invoke a process bubble.
3) A process bubble can only transmit or receive data from a data store via a data flow.
4) A control bubble can only receive and use data as part of determining which process bubble is to be called.
5) A control bubble can use process bubbles that have completed to sequence to other process bubbles.
6) Data used by a control bubble must be from a process flow.
7) Process bubbles always return control to their calling control bubble.
8) A control bubble can receive/use/send control signals from/to control flows.
9) Process bubbles can decompose into simpler process bubbles and/or a single control bubble and process bubbles.

Figure 6A:
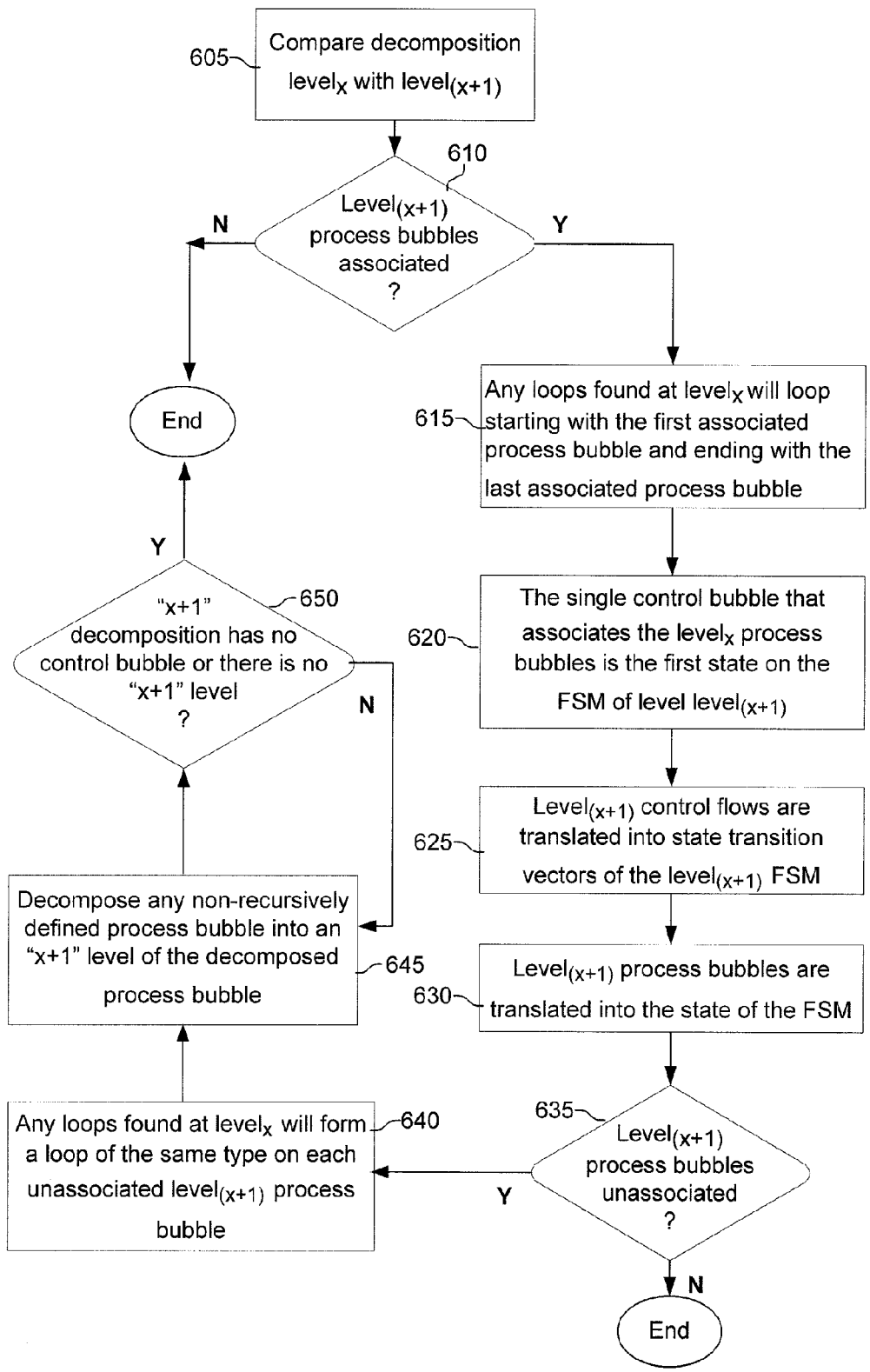
FIG. 6a is a flowchart showing an exemplary algorithm for converting an MPfd to a finite state machine.

An exemplary algorithm for converting an MPfd to a finite state machine is shown in FIG. 6A and described below.

Conversion Algorithm

Step 605: Compare decomposition $level_x$ with $level_{(x+1)}$ and determine if $level_{(x+1)}$ process bubbles are associated or un-associated. A functional decomposition element, herein represented by a bubble symbol, can decompose into two types: associated and unassociated. Association has to do with the next-level decomposition of the bubble. Depending on the association type, loops defined at a higher decomposition level behave differently when they are integrated into a lower decomposition level.

If an un-decomposed bubble labeled "A" is decomposed into bubbles labeled "1", "2", "3", and "C", then the un-decomposed bubble is said to reside at Level 1. Bubbles "1", "2", "3", and "C" are said to reside at Level 2. If a control-flow links together any level 2 bubbles, then those bubbles are said to be associated. If the control-flows do not link together the level 2 bubbles, those bubbles are said to be unassociated.

Step 610: If $level_{(x+1)}$ process bubbles are associated, then perform the following steps 615-630.

Step 615: Any loops found at $level_x$ start with the first associated process bubble and end with the last associated process bubble. That is, multiple states are in the loop. All loops are associated with the set of process bubbles. This step machine-analyzes the design and correctly interprets how the loops work. Using information from one decomposition level to next allows the system to change the algorithm definition file 116 such that the loops are executed correctly.

Step 620: The single control bubble that associates the $level_x$ process bubbles will be the first state on the FSM of $level_{(x+1)}$.

Step 625: $Level_{(x+1)}$ control flows are translated into state transition vectors of the $level_{(x+1)}$ FSM.

Step 630: $Level_{(x+1)}$ process bubbles are translated into the state of the FSM.

Step 635: If $level_{(x+1)}$ process bubbles are un-associated, then perform the following.

Step 640: Any loops found at $level_x$ will form a loop of the same type on each un-associated $level_{(x+1)}$ process bubble.

Step 645: Decompose any non-recursively defined process bubble into an "x+1" level of the decomposed process bubble. Decomposition levels are complete when an "x+1" decomposition has no control bubble (a group of un-associated process bubbles) or when there is no "x+1" level (step 650). All $level_{(x+1)}$ data stores are hidden within the states of the FSM. The various "x+1" levels are represented as nested states, that is, each state is also an FSM.

Figure 7:
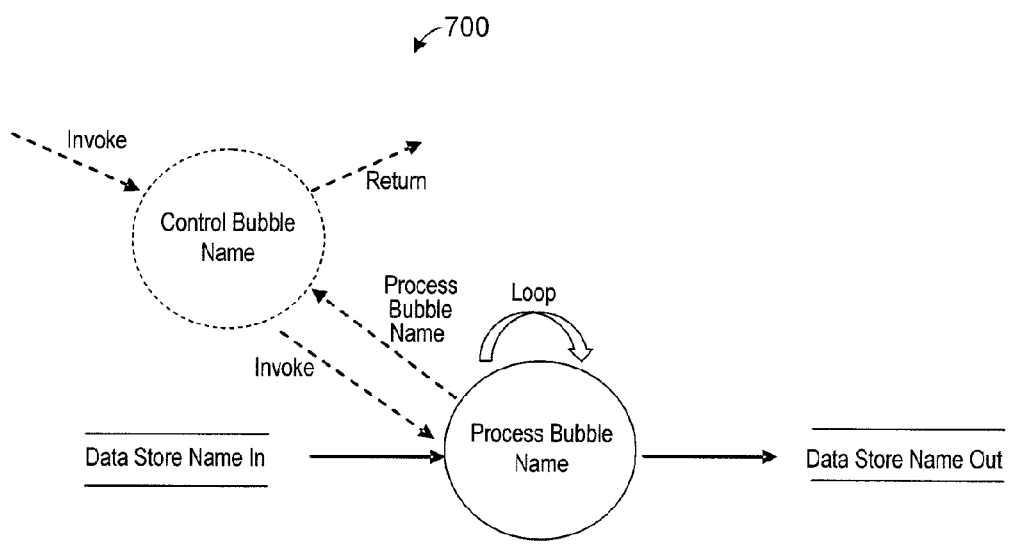
FIG. 7 shows an exemplary functional decomposition diagram.
Figure 8:
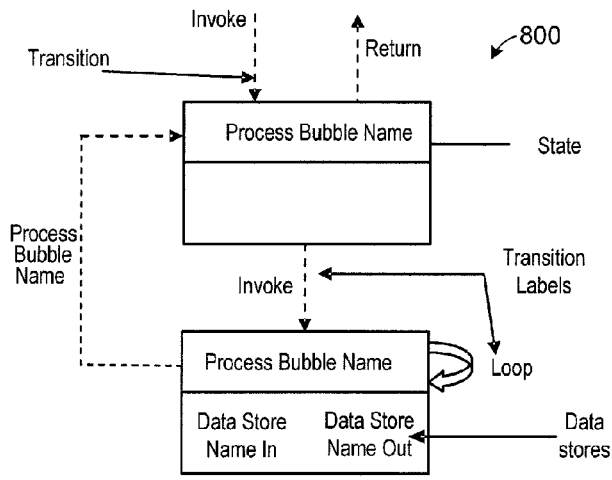
FIG. 8 shows a finite state machine view of the translation of a single-process bubble into its state machine equivalent.

FIG. 7 shows an exemplary functional decomposition diagram 700 and FIG. 8 shows a finite state machine view of the translation of a single-process bubble into its state machine equivalent. As used herein, the term "bubble" refers to a graphical element such as a solid or dashed line having the approximate form of a circle, ellipse, polygon, or the like.

Notice that the control bubble is shown in the finite state machine view as the first state; only the control flows are seen, and these act as state transitions. The looping structure is captured as a looping state transition in the finite state machine 800. The process bubbles are translated into the states of the finite state machine. The data stores are captured as part of the states. Throughout this document, where applicable, both the functional decomposition and finite state machine view are shown in the Drawings.

Lower Level Decomposition

All decomposition levels below level 0 have one additional item: the control bubble. There is only one control bubble per function decomposition. The purpose of the control bubble symbol is to indicate a structure that performs only transitions and does not perform processing. This symbol has the effect of insuring that all non-looping control is fully exposed. Allowing only a single control bubble per function decomposition forces the complexity of the work to be expressed primarily through decomposition, insuring a structured decomposition with the minimum amount of complexity for each of the decompositions. The control bubble retains the name of the higher-level process bubble.

Figure 9:
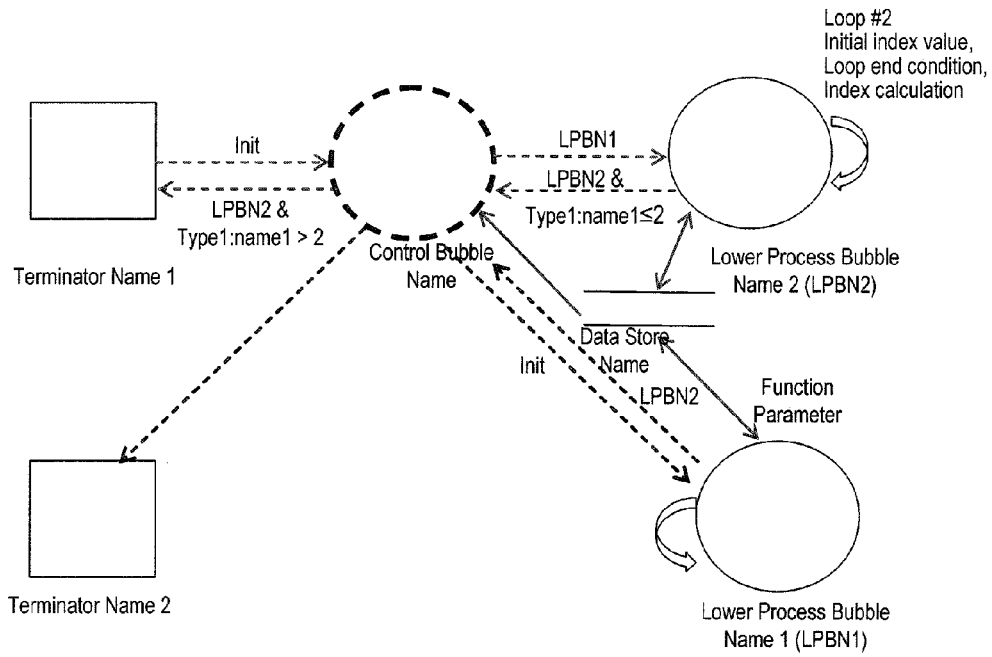
FIG. 9 shows an exemplary lower level decomposition diagram, functional decomposition view.
Figure 10:
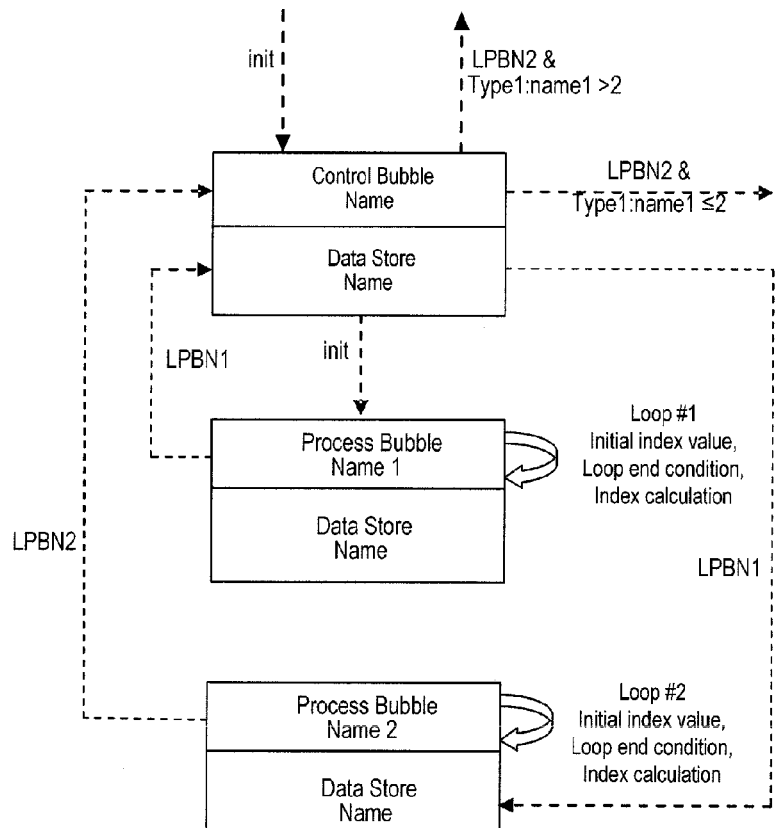
FIG. 10 shows an exemplary lower level decomposition diagram, finite state machine view.

FIGS. 9 and 10 respectively show functional decomposition and finite state machine views of an example of a lower level decomposition. The process bubbles cannot directly send information from one process bubble to another but can do so through a data store. If the data store has the same name, the finite state machine view assumes it will have the same memory addresses. Likewise, a process bubble cannot directly transition to another process bubble but can do so through a control bubble, which is always the initial state.

Multiple Loops

Figure 11:
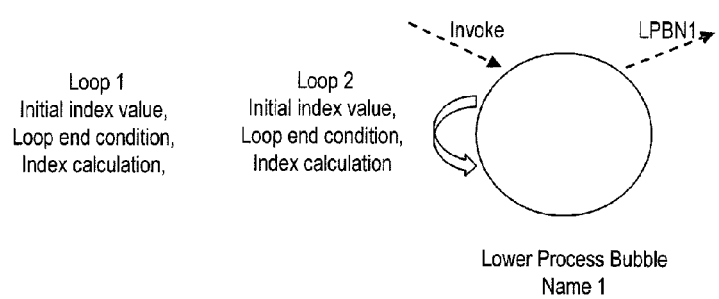
FIG. 11 shows multiple loops, functional decomposition view.
Figure 12:
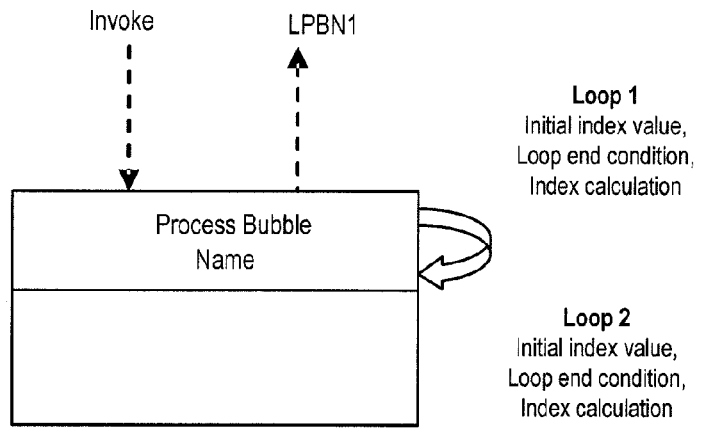
FIG. 12 shows an example of multiple loops, finite state machine view.
Figure 13:
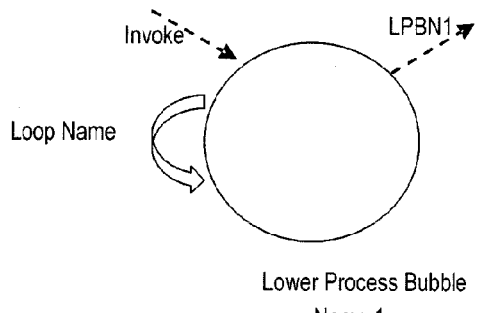
FIG. 13 shows an example of a loop with label, functional decomposition view.
Figure 14:
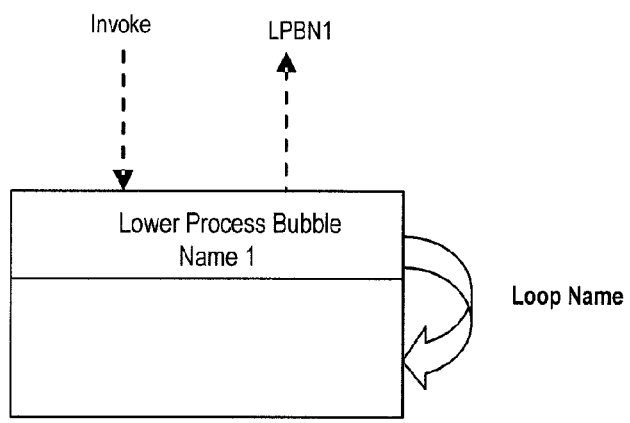
FIG. 14 shows an example of a loop with label, finite state machine view.

In order to denote multiple loops, each loop definition is defined separately. FIGS. 11 and 12 respectively show functional decomposition and finite state machine views of multiple loops. As shown in FIGS. 10 and 11, "LPBN1" represents "Lower Process Bubble Name 1":

Because multiple loop definitions can take up so much space on the diagram, a label representing a loop definition table can be used instead, changing the loop display to that shown in FIGS. 13 and 14, which respectively show functional decomposition and finite state machine views of an exemplary looping operation.

Selecting the loop name can cause the loop definition(s) to be displayed as shown in Table 1, below:

TABLE 1

EXAMPLE LOOP LABEL DEFINITION
Loop Name

| Loop 1 | Initial index value 1 | Index Calculation 1 | Loop End Condition 1 |
| --- | --- | --- | --- |
| Loop 2 | Initial index value 2 | Index Calculation 2 | Loop End Condition 2 |

All loops associated with a process bubble are considered nested loops: one loop is within another loop. The first loop defined is considered the inner-most loop, with each successive outer loop defined as surrounding the inner loop. Thus, the example given in FIG. 11 and Table 1 means that Loop 2 is inside of Loop 1; that is, Loop 1 is invoked after Loop 2. Parallel loops occur when two or more process bubbles, without any mutual dependency and occurring at the same decomposition level, each have a loop. The loops of these independent, loop-bearing process bubbles can occur in parallel.

Data Elements

Variables, Arrays, and Matrices

Variables, arrays, and matrices represent data elements of various orders. A variable is a single data element of a certain type and can be thought of as a zero-dimensional object. An array consists of multiple data elements arranged linearly and can be thought of as a single-dimensional object. A matrix consists of multiple data elements arranged into greater than one dimension and can be thought of as a higher-dimensional object. Transitions and loops can use these data objects in their conditions and calculations. This means that there must be a precise way to discuss all data objects.

Figure 15:
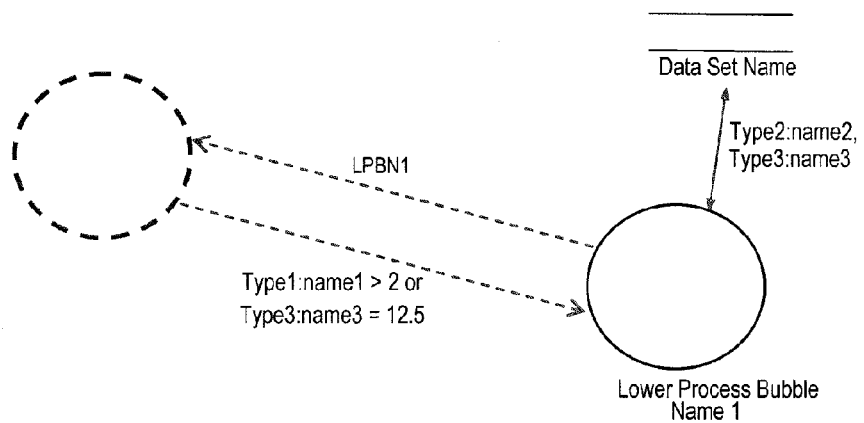
FIG. 15 shows an example of multiple data on lines and multiple conditions on transition.

As with the looping structures, there can be multiple data elements per input/output data line or transition. This means that the line or transition can be identified using a label that points to the appropriate definition, as shown in FIGS. 15 and 16, which respectively show functional decomposition and finite state machine views.

Figure 16:
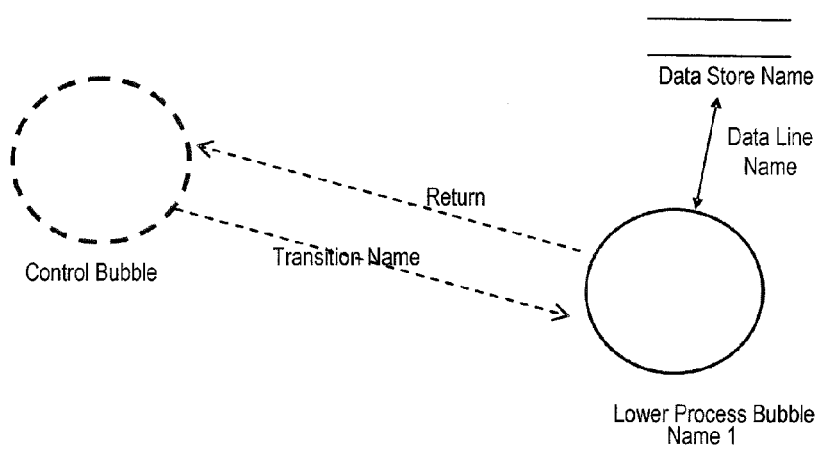
FIG. 16 shows an example of transition and data lines using labels.

Selection of the labeled transition in FIG. 16 would then display:

| TRANSITION NAME | |
| --- | --- |
| Condition 1 | Type1:name1 > 2 |
| Condition 2 | Type3:name3 = 12.5 |

Selection of the labeled data line in FIG. 16 would then display:

| DATA LINE NAME | |
| --- | --- |
| Data Element 1 | Type2:name2 |
| Data Element 2 | Type3:name3 |

Variables

A variable only requires a label and a type in order to identify it. The following composite label will fully identify a variable:

Type:variableName

Figure 17:
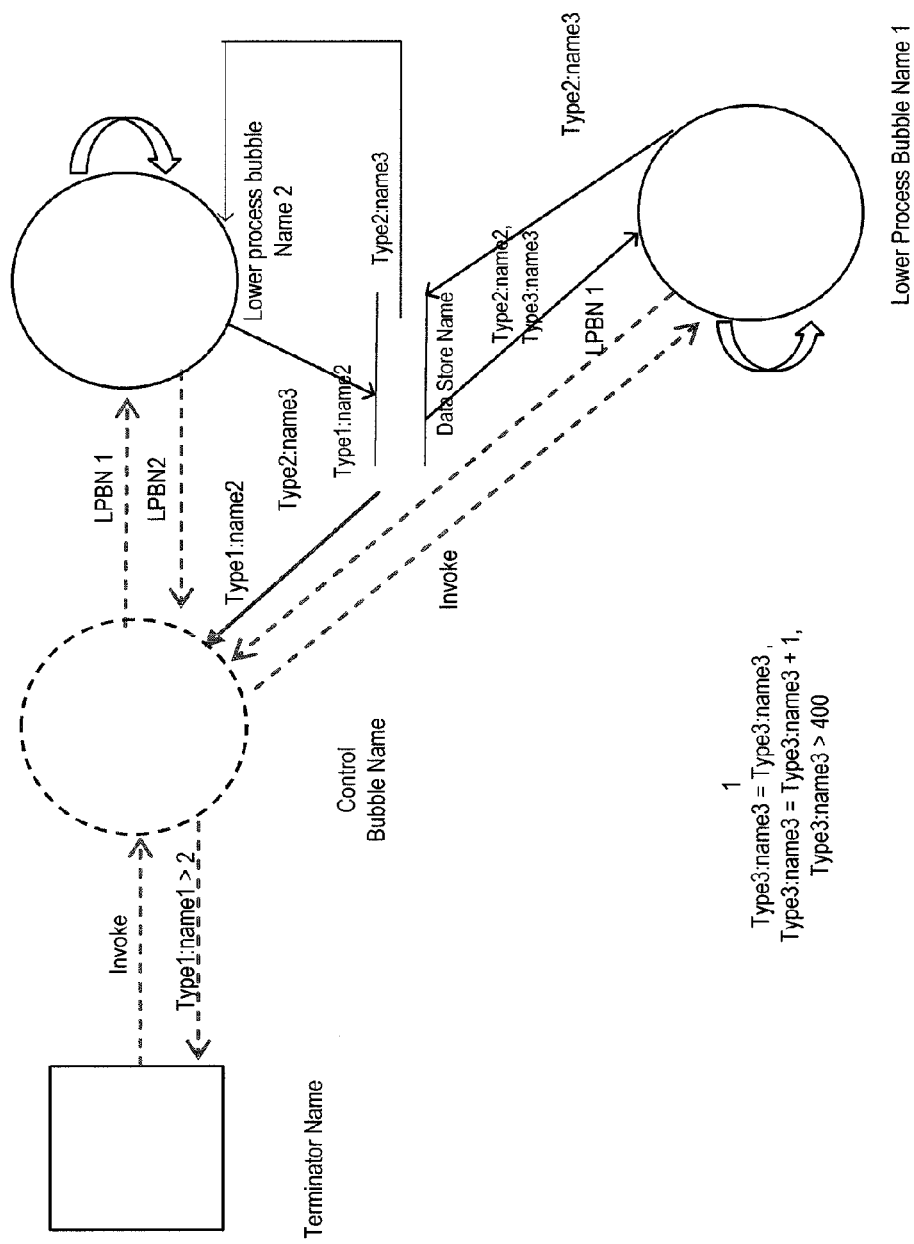
FIG. 17 is an exemplary lower level decomposition diagram with composite variable names, functional decomposition view.

The composite variable name changes the "Function Parameters Names" to a comma-separated list of composite variable names, as shown in FIG. 17, which is a functional decomposition view of an exemplary lower level decomposition with composite variable names.

Arrays

An array requires a composite consisting of a label, a type, and an array index or element number to identify it. The following composite label will fully identify an array:

Type:variableName:"index or element #"

If the symbol after the second colon is a Greek symbol, it represents an index; otherwise, it represents an array element. The first index represents a row in MPfd, the second index a column, and the third index the matrix depth.

Designating multiple array elements does not designate a loop, only the movement of a certain number of variables.

Figure 18:
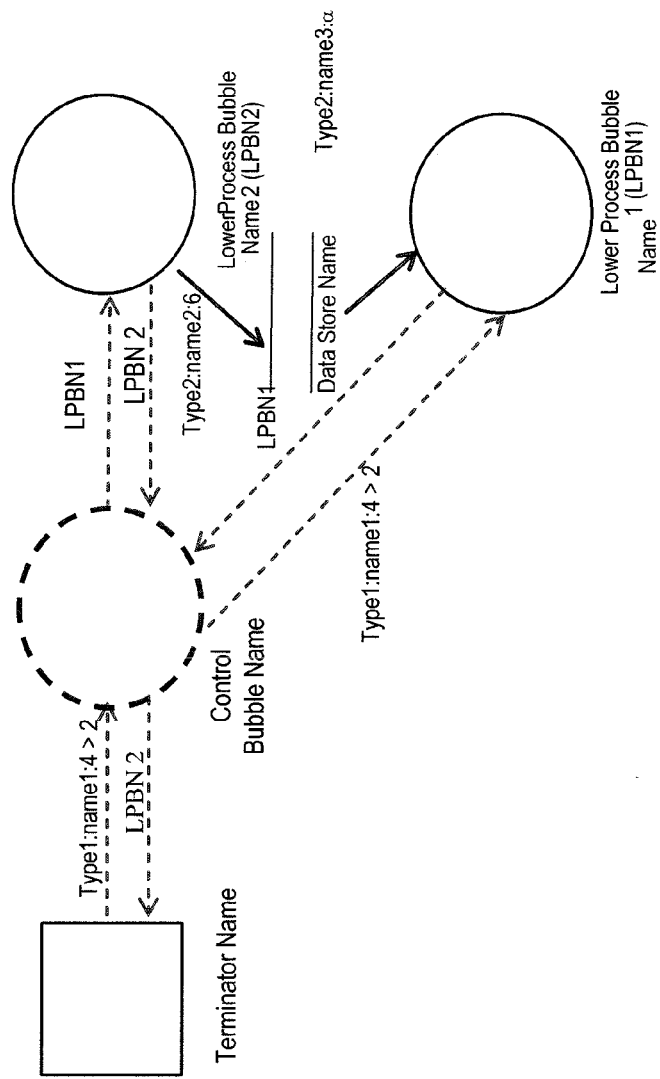
FIG. 18 is an exemplary lower level decomposition diagram without composite array names and dimensionality.
Figure 19:
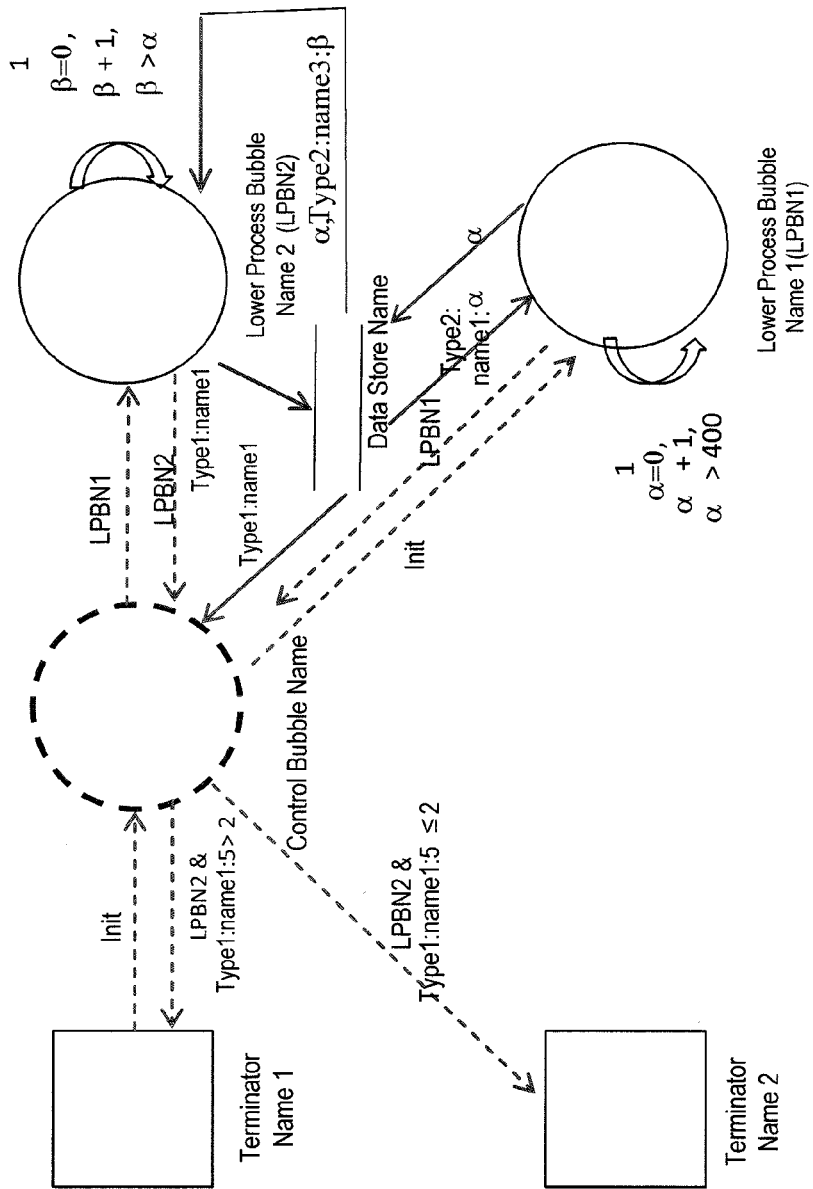
FIG. 19 is an exemplary lower level decomposition diagram with composite array names and dimensionality.

The composite array name changes the "Function Parameters Names" to a comma-separated list of composite array names, as shown in FIG. 18 (lower level decomposition diagram without composite array names and dimensionality) and FIG. 19 (lower level decomposition diagram with composite array names and dimensionality).

Matrices

A matrix requires a composite consisting of a label, a type, and multiple array element designations to identify it. The following composite label will fully identify an array:

Type:variableName a,b, . . . n

Each matrix element represents a matrix dimension. The first element represents the first dimension, the second element the second dimension, etc.

Figure 20:
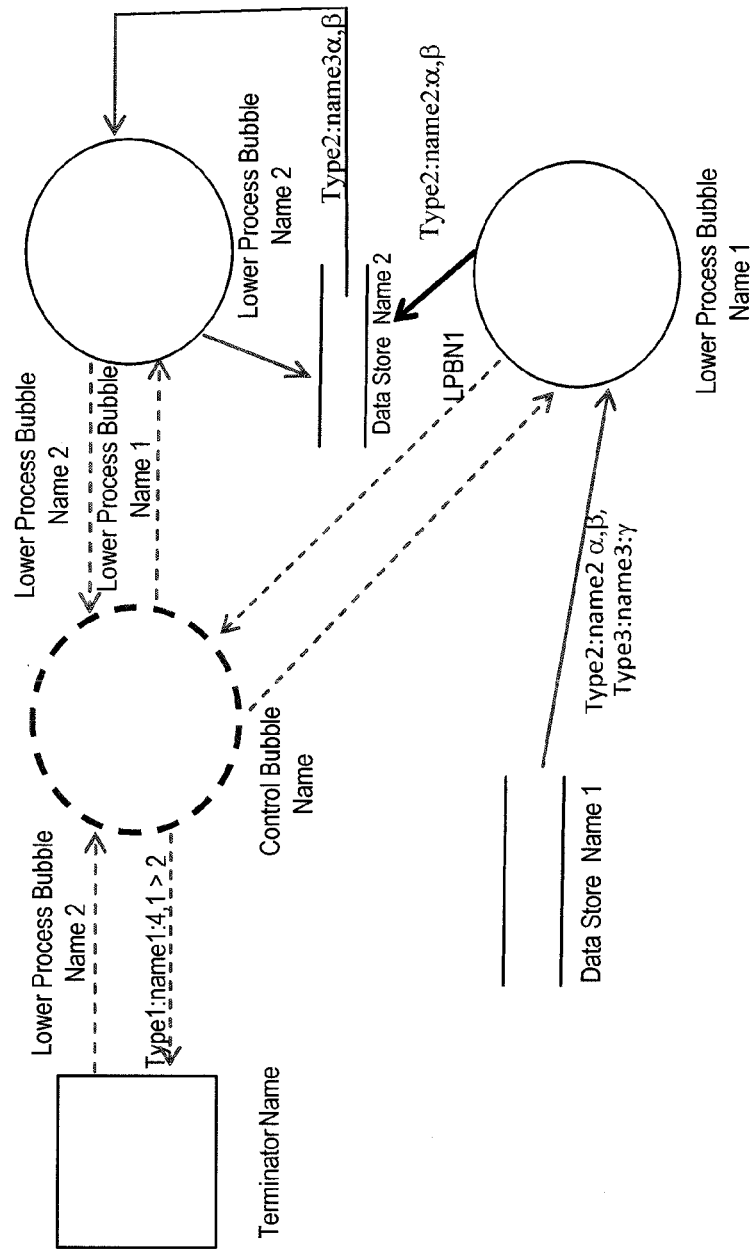
FIG. 20 is an exemplary lower level decomposition diagram with composite matrix names with multiple dimensions.

The composite matrix name changes the "Function Parameters Names" to a comma-separated list of composite matrix names, as shown in FIG. 20, which illustrates a lower level decomposition with composite matrix names with multiple dimensions.

Profiling to Determine Node Count

Determining how well a process bubble will scale requires knowing how much exposed work and how much exposed communication time is present. The work time can be obtained by measuring the execution time of the process bubble's attached code with data of a known size. The data comes from the test plans and procedures that are attached to every process bubble of every project designed using the MPfd model. The communication time comes from the a priori determination of actual communication time and actual latency time. As long as the following criteria is met, computational elements can be added to increase the processing performance of a process bubble, as shown in Equation 2:

$$S_t/(M_t+E_t)>T \qquad \text{Equation 2 Profile Parallel Target}$$

Where: $S_t$=Single-node processing time
$M_t$=Multi-node processing time
$E_t$=Exposed communication time The target value T can be set by the present system. Profiling will continue until the condition is no longer met. The minimum, maximum, and median dataset sizes associated with a design bubble for an particular kernel or algorithm are used to calculate the number of processing elements for any dataset size greater than the minimum and less than the maximum.

Automatic Selection of Data Movement Model

In computer science parlance, there are two ways to transmit data into a function: pass-by-value and pass-by-reference. Pass-by-value simply means that only the contents of some memory location are transmitted to the function. Sending the contents of a memory location is equivalent to having a constant as an input parameter. That is, all changes made to the value are kept internal to the function with none of those changes accessible outside of the function. This provides for the "encapsulation" of data, insuring that unwanted side effects do not occur between functions. Pass-by-reference allows a function to have multiple output parameters.

The following information is associated with a data element on an MPfd: composite name, input designation, and output designation. The input/output designations are a function of the directions of the lines associated with the composite name. The three possibilities are input, output, or both.

Pass by Value

In an MPfd, pass-by-value is another way of saying that a scalar data element (not an array or matrix) is only input into a function, never output from a function. A constant value must also be passed by value as there is no variable, hence no possibility of referencing a memory location. The input-only scalar data element or constant must use pass-by-value, insuring that the data use is encapsulated. Thus, whenever a scalar or constant input is used in an MPfd, it will signify the use of the pass-by-value method.

Pass by Reference

If the composite name in an MPfd refers to vector data (an array or matrix), particular data elements must be accessible. In computer programming, such access occurs as an offset to some base location. Thus, the base memory location must be transmitted to the function. Also, if the contents of a memory location must change (as is the case for output scalars), the memory location of the data element needs to be known. In both cases, a memory location is passed to the function, called referencing, and the contents of the memory location(s) accessed, called dereferencing. This allows the memory locations to be accessed and changed, with the changes visible to other functions simply using the same differencing method.

Functional Decomposition Data Transmission Model

Since it is possible for an MPfd to determine the data transmission model (pass-by-value or pass-by-reference) automatically from information generated as part of an MPfd, one of the most confusing aspects of modern computer programming can now be performed automatically, from design.

Automatic Detection of Parallel Algorithm Decomposition

There are two types of parallel processing indicators that can be included on MPfd design diagrams: structural and non-structural. Structural parallel indicators are determined by the design without any extra information. Task parallelism is an example of structural indication. Other types of parallelism detectable via structural indication include: transpose detection, parallel I/O detection, scatter detection, and gather detection.

Non-structural parallel indicators need more information than is usually given in design in order to determine the type of parallelism. Variable definitions in computer languages only support the following information: variable name, variable type, and number of dimensions. Parallelizing a code requires two other types of information: topology and data intent. Topology defines the computational behavior at the edges of a vector or matrix—examples include: Cartesian, toroidal, and spherical.

Data intent is the intended use of the data; examples include:

(1) particle-like usage—the data represents particles that move throughout a matrix and may interact,
(2) field-like usage—a force that affects to some degree data across a large section of the matrix simultaneously,
(3) search-like intent—data that interacts with a larger set of data, giving some result, and
(4) series expansions/contractions—calculation of the terms of a mathematical series.

The present MPfd method allows a designer to indicate the algorithm processing topology and the data intent, giving the design the information required to complete the parallel processing. The topology can be calculated by the present system 100 based upon the data intent. Alternatively, the topology information can be added to the vector or matrix information of the input data of a transformation by the designer.

Since an algorithm is defined as a functional decomposition element, it can be decomposed into multiple, simpler algorithms and/or kernels. As previously noted, a functional decomposition element, herein represented by a bubble symbol, can decompose into two types: associated and unassociated. Association has to do with the next-level decomposition of the bubble. Depending on the association type, loops defined at a higher decomposition level behave differently when they are integrated into a lower decomposition level.

Figure 21:
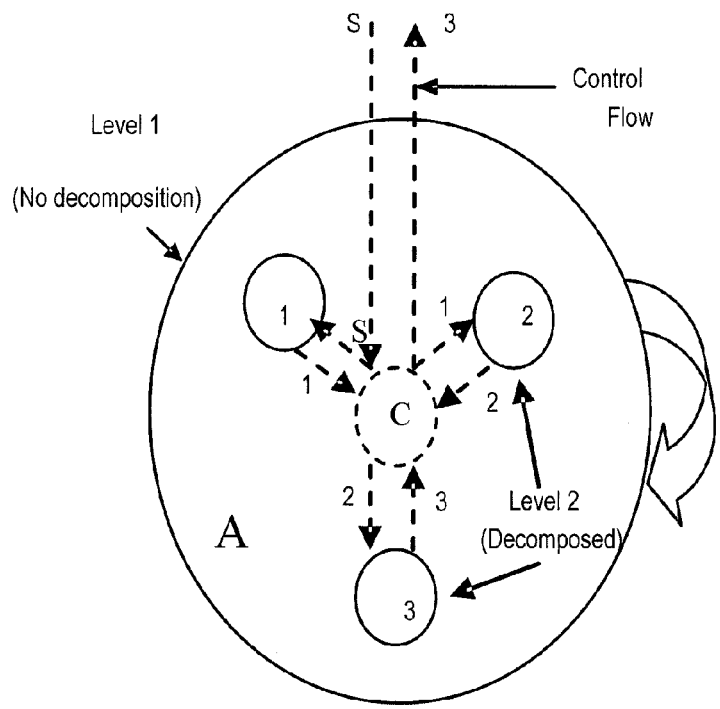
FIG. 21 shows an example of associated bubbles linked via control-flows.

If the un-decomposed bubble labeled "A" is decomposed into bubbles labeled "1", "2", "3", and "C" then the un-decomposed bubble is said to reside at Level 1. Bubbles "1", "2", "3", and "C" are said to reside at Level 2. If the control-flows link together the level 2 bubbles then those bubbles are said to be associated. FIG. 21 shows an example of associated level-2 bubbles linked via control-flows.

If a looping structure is added to Level 1 (Bubble A) then this is interpreted to have the following effect on Level 2: 1) the loop will start with the activation of the first process bubble and end with the last process-bubble ending, 2) the loop will continue to restart the first process bubble until the end-of-loop condition occurs, and 3) upon completion of the loop, control will be transferred back to the original level-1-defined control bubble or terminator. This is also shown in FIG. 21.

Figure 22:
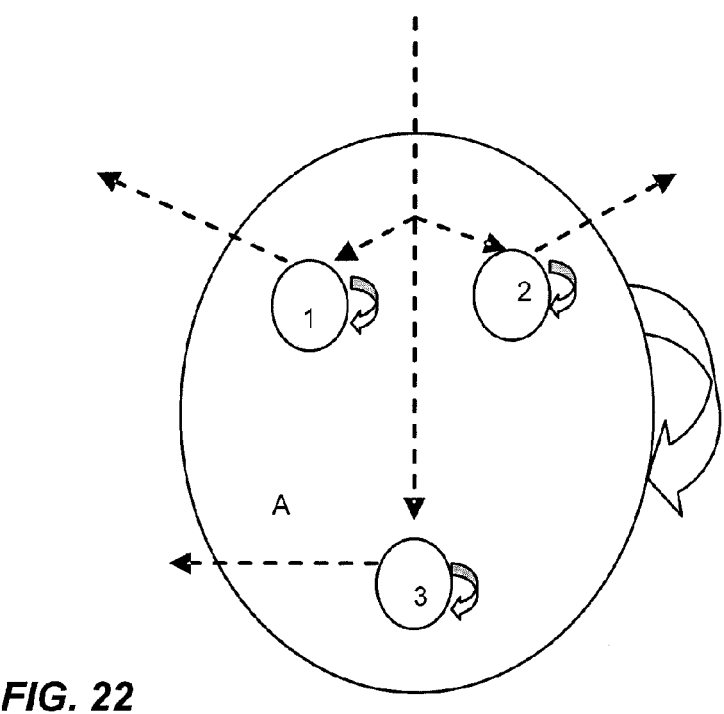
FIG. 22 shows an example of unassociated bubbles.

If the control-flows do not link together the level 2 bubbles, those bubbles are said to be unassociated. FIG. 22 shows an example of unassociated level-2 bubbles.

Figure 23:
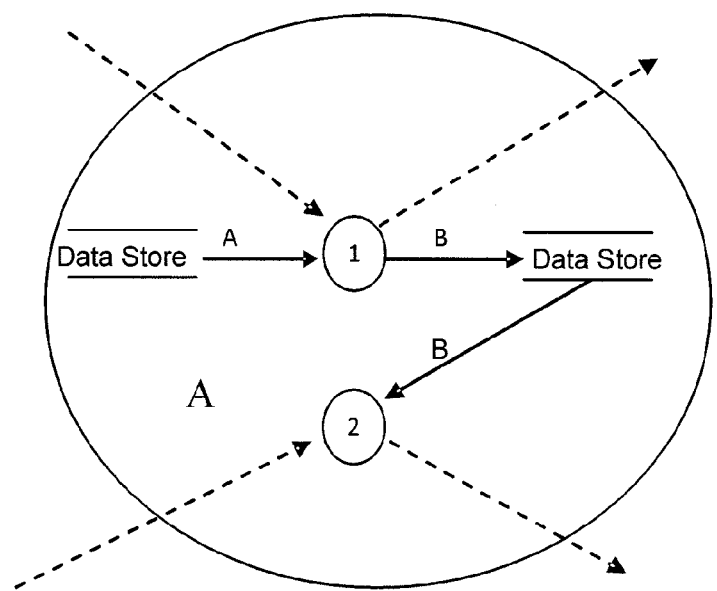
FIG. 23 shows an example of data associated bubble.

If a looping structure is added to Level 1 (Bubble A) then the looping structure is added to each of the unassociated level 2 bubbles. This is shown in FIG. 23. It is possible for level 2 bubbles to appear to be unassociated because no control-flow binds them but be associated instead via data. Data-associated level 2 bubbles are shown in FIG. 23.

Figure 24:
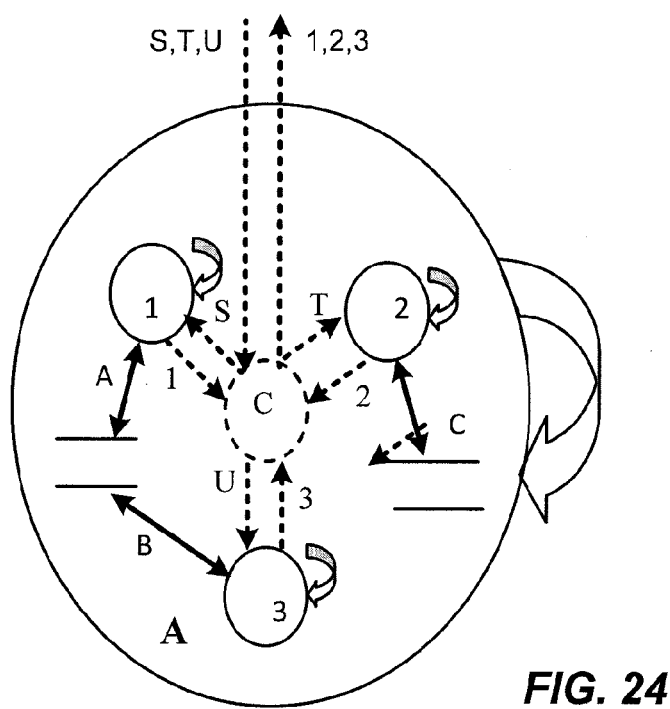
FIG. 24 shows an example of control linked, unassociated level-2 bubbles.

Similarly, it is possible to have level-2 bubbles which use the same control structure actually be unassociated as long as neither the control-flows nor the data associates them. This type of unassociated bubble structure is shown in FIG. 24.

Figure 25:
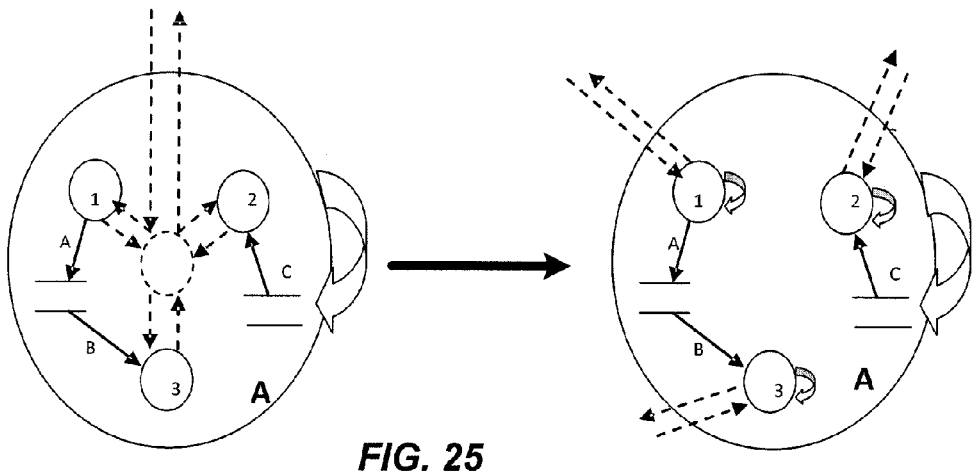
FIG. 25 shows an example of transformation to standard unassociated form.
Figure 26:
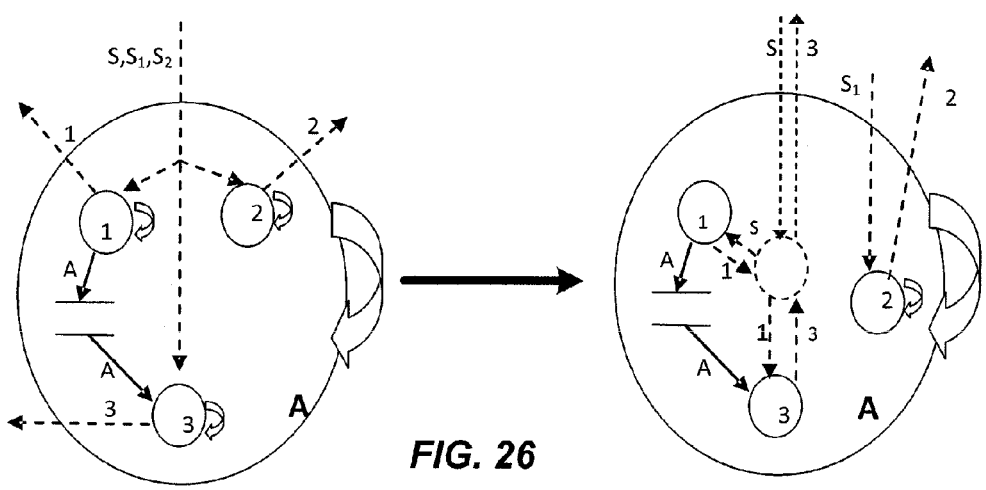
FIG. 26 shows an example of transformation to standard associated form.

If the decomposition is incorrect, it is sometimes possible to rearrange the decomposition based upon association. An example of this transformation to standard unassociated form is shown in FIG. 25. Similarly, it is sometimes possible to rearrange the decomposition based upon un-association, as shown in FIG. 26, which is an example showing transformation to standard associated form.

Unassociated Process Bubbles Indicating Task Parallelization

Figure 27:
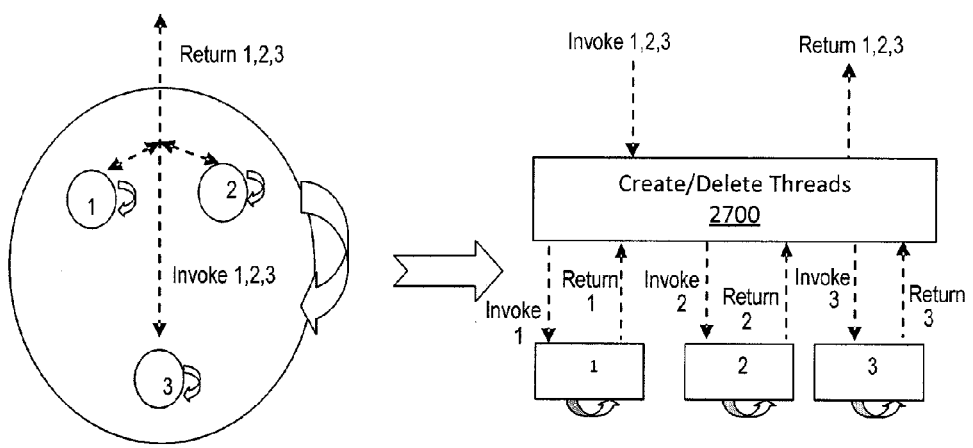
FIG. 27 shows an example of unassociated process bubbles to task parallel indicating finite state machine.

When process bubbles are grouped together but are not associated, this indicates that those processes can occur at the same time if the tasks are executed on parallel hardware. FIG. 27 shows unassociated process bubbles to task parallel indicating finite state machine. Block 2700 indicates a new state made by the system, creating task level parallelism.

Transpose Notation

Figure 28:
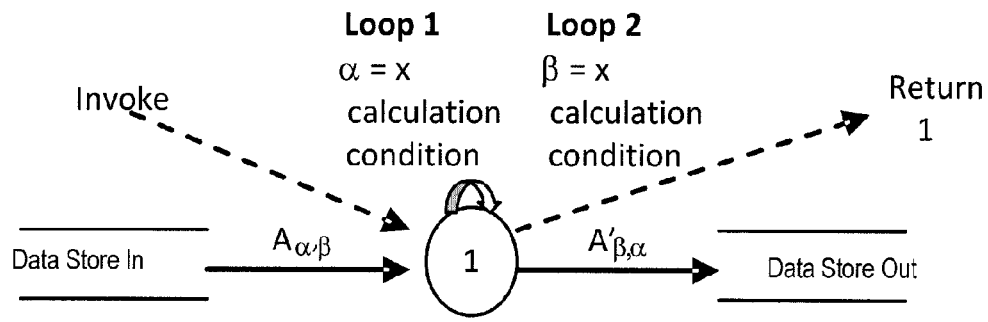
FIG. 28 shows an example of transpose notation, functional decomposition view.
Figure 29:
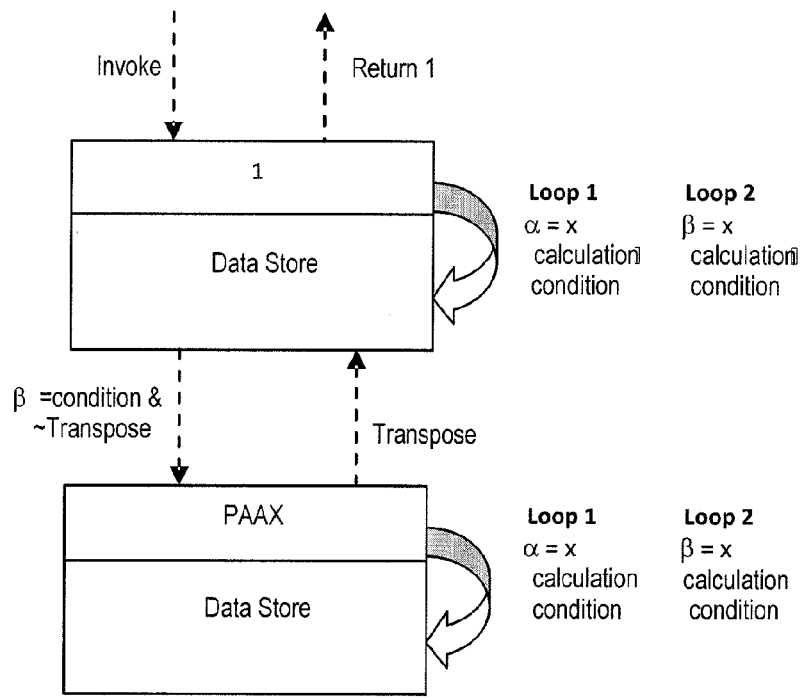
FIG. 29 shows an example of transpose notation, finite state machine view.

By telling the functional decomposition elements that a vector's or an array's data comes in and is processed then leaves, an opportunity to perform a scatter/gather operation (described below) is defined. The indices on an input vector or matrix are reversed on the output version of the same matrix, and the indices are found in the loop, as shown in FIG. 28, which shows a transpose notation in functional decomposition view. Note that the accent mark by the second "A" means that at least one element of array A has been changed. FIG. 29 shows a transpose notation in finite state machine view.

Scatter/Gather Notation

Figure 30:
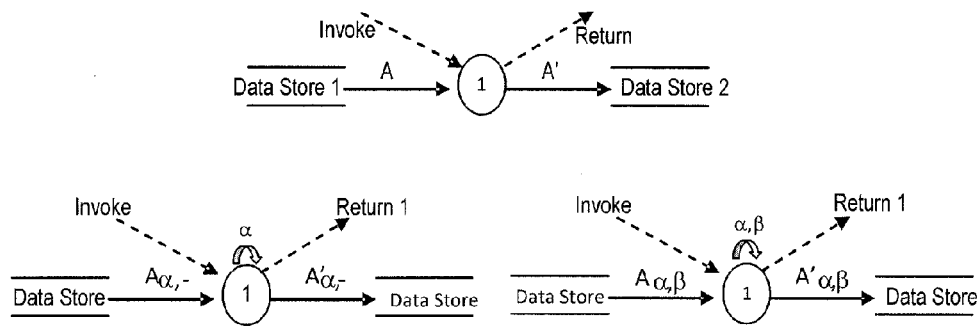
FIG. 30 shows an example of scatter/gather notation, functional decomposition view.
Figure 31:
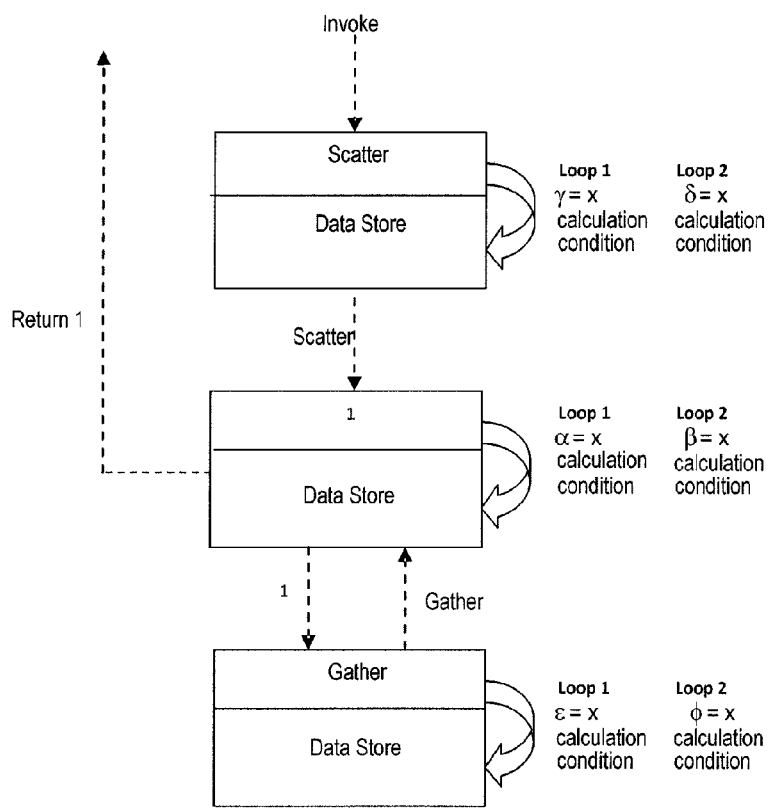
FIG. 31 shows an example of scatter/gather, finite state machine view.

A scatter/gather moves data to multiple nodes or gathers information from multiple nodes. The indices of the loops match the active indices of the data, and the order of the data indices does not change. FIG. 30 shows an example of scatter/gather notation, functional decomposition view, and FIG. 31 shows the corresponding finite state machine view. Note that if bubble 1 is the first activated process bubble then "A'" is an input. if bubble 1 is the last process bubble then "A" is an output matrix.

Parallel Input/Output Indication

Figure 32:
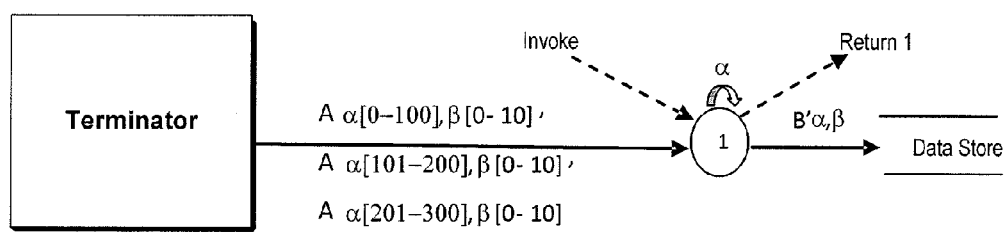
FIG. 32 shows an example of parallel i/o indication.

Parallel input and output is defined as being from/to a terminator block. Since a terminator block represents another system interfacing with the currently under-design system, obtaining data from this external system is considered input and transmitting data to this external system is considered output. Inputs and outputs to/from terminator blocks can designate that data for the same vector or matrix is being received or sent via separate, parallel data lines by adding the "[ ]" designator to the vector or matrix index. For example, the following are parallel input-data streams defined, as shown in FIG. 32:

$A_{\alpha[0-100],\beta[0-10]}$=2-dimensional array "A" with indexes $\alpha$ and $\beta$.

Elements 0 through 100 of index $\alpha$ and elements 0 through 10 of index $\beta$ are input.

$A_{\alpha[101-200],\beta[0-10]}$=2-dimensional array "A" with indexes $\alpha$ and $\beta$.

Elements 101 through 200 of index $\alpha$ and elements 0 through 10 of index $\beta$ are input.

Figure 33:
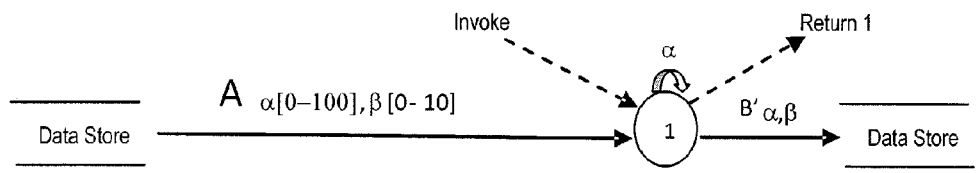
FIG. 33 shows an example of selecting particular matrix elements.

$A_{\alpha[201-300],\beta[0-10]}$=2-dimensional array "A" with indexes $\alpha$ and $\beta$ Output works analogously. If separate vector or matrix elements are input/output to/from a process bubble but not to/from a terminator, then a simple element selection is indicated. An example of selecting particular matrix elements is shown in FIG. 33, wherein process element "1" receives data elements from the "A" matrix rows 0 through 100 and columns 0 through 10.

Decomposition Completeness

Figure 34A:
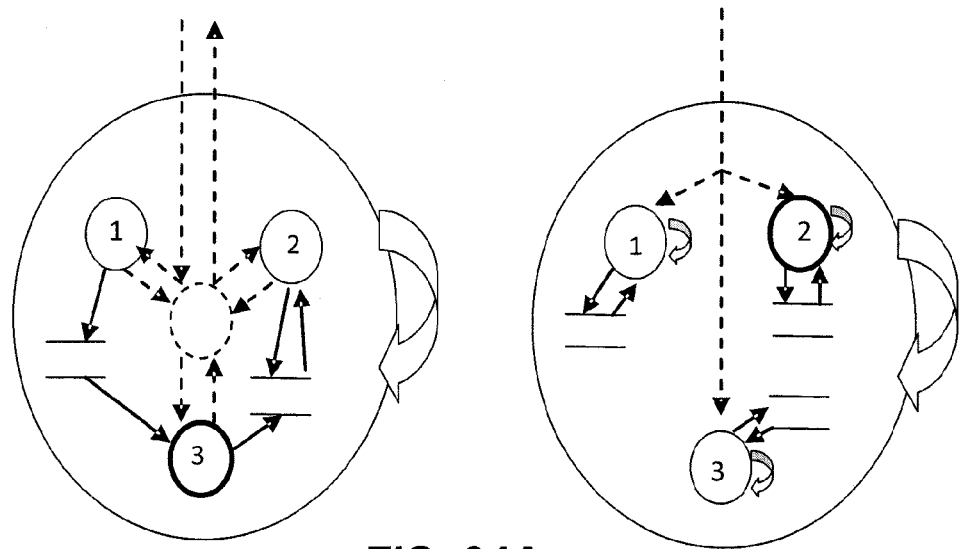
FIGS. 34a and 34b show examples of incomplete decomposition.
Figure 34B:
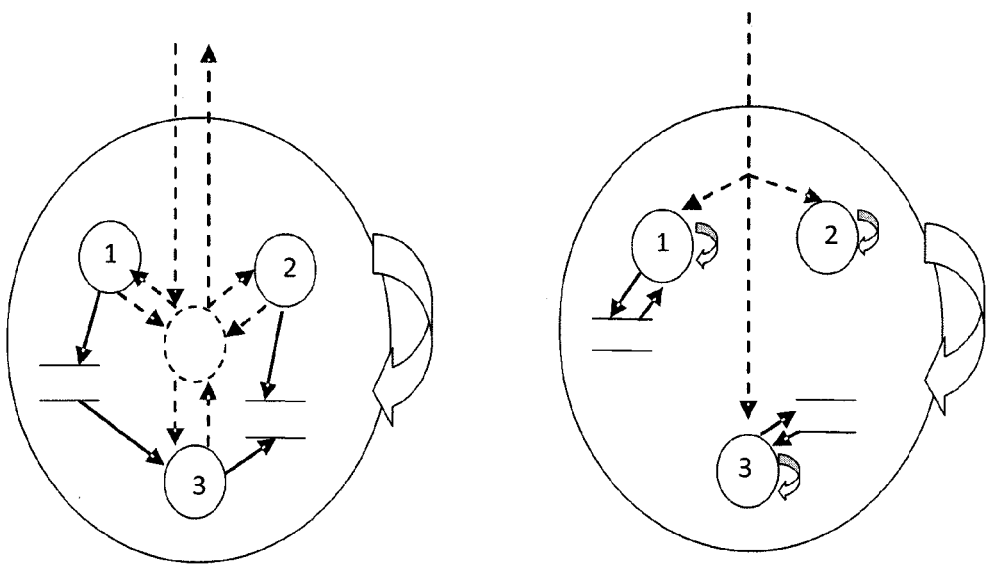

The present system can automatically determine if a functional decomposition is complete, as indicated in FIGS. 34A/34B, which illustrate examples of incomplete decomposition. One example of incomplete decomposition is shown in FIG. 34A. If there is at least one algorithm (bubble 3 in the left-hand diagram, or bubble 2 in the right-hand diagram) which does not decompose into only process and control kernels (the remaining bubbles in FIG. 34A) then the decomposition is incomplete. Another example of incomplete decomposition is shown in FIG. 34B. If there is a bubble that does not have at least one input and one output then the decomposition is considered incomplete.

Cross-Communication Notation

Data-type issues typically revolve around the concept of data primitive types: integer, real, double, complex, float, string, binary, etc. Groups of data entities are discussed via their dimensionality, as structures, or as structures containing data entities with various dimensionalities. Data primitives, data group structure, and dimensionality all represent a static view of the data. In an MPfd, this information is placed in a table that appears on data flows and data stores. Table 2, below, is an example of a table that provides this information.

TABLE 2

| | | VARIABLE DESCRIPTION | | | |
|---|---|---|---|---|---|
| Variable Name | Variable Description | Variable Type | # Dimensions | Dimension Sizes | Topology |
| | | | | | |

The variable name gives a name to an object for the Decomposition Analysis graph. The description is a text description of the variable just named. The variable type is the data-primitive type. The number of dimensions describes the dimensionality of the variable: 0-dimension means a standard variable, 1-dimension a vector, and >1-dimension a matrix. The dimension size is required for >1-dimensional objects to indicate the number of variable objects that occur in each dimension. The topology explains how the >0-dimensional object treats its space.

The following are potential topologies: unconnected edges: Cartesian; connected edges: 1-dimension (ring), 2-dimensions (cylindrical, toroid, spherical), and 3-dimensions (hyper-cube). The topology information follows the variable.

In computer systems, data is rarely static; it is moved, transformed, combined, taken apart: data in computer systems is typically dynamic. The dynamic use of the data is an attribute that is not typically shown in standard representations of data for computer use. With the advent of parallel processing, the dynamic aspects of the data are needed for the selection of the proper parallel processing technique. Examples of the graphical depiction of possible dynamic data usage are shown below.

Monotonic Data Use

Concept: Linked calculations whose workload grows or shrinks after each calculation.

Use: Whenever the workload changes monotonically for each component calculation in a series of calculations.

Example Use: Arbitrary precision series expansion calculation of transcendental numbers.

Parallel Issue: Load balancing. Since the workload changes monotonically, the last calculation has a workload that is very different from the first calculation. Since the computation time of a group of nodes working on a single problem is equal to computation time of the slowest node and, further, since the effect of naively placing the work in the same order as the calculation order is to concentrate the work onto a single node, this produces a non-optimal parallel solution.

Topology Effects: None

Action: Create a mesh to provide load balancing.

Action Example: The purpose of this mesh type is to provide load balancing when there is a monotonic change to the work load as a function of which data item is used. The profiler shall calculate the time it takes to process each element. Below shows a naive attempt to parallelize such a problem. Sixteen work elements are distributed over four computational nodes. The work increases or decreases monotonically with the work-element number. Below is a 1-dimensional example of a naive work distribution of a monotonic workload-changing problem.

TABLE 3

NAIVE WORK DISTRIBUTION OF A MONOTONIC WORKLOAD CHANGING PROBLEM

| | Node # | | | |
|---|---|---|---|---|
| | $Node_1$ | $Node_2$ | $Node_3$ | $Node_4$ |
| Work Elements | 1, 2, 3, 4 | 5, 6, 7, 8 | 9, 10, 11, 12 | 13, 14, 15, 16 |

The mesh shown in Table 3 decomposes the work elements by dividing the number of work elements by the number of nodes and assigning each work element to each node in a linear fashion.

Instead of linearly assigning work elements to nodes, the work elements can be alternated to balance the work. For monotonic workload changes, this means the first and last elements are paired, the second and second-to-last elements are paired, etc., as shown in Table 4:

TABLE 4

NON-NAÏVE WORK 1-DIMENSIONAL DISTRIBUTION OF A MONOTONIC WORKLOAD CHANGING PROBLEM

| | Node # | | | |
|---|---|---|---|---|
| | $Node_1$ | $Node_2$ | $Node_3$ | $Node_4$ |
| Work Elements | 1, 16, 2, 15 | 3, 14, 4, 13 | 5, 12, 6, 11 | 7, 10, 8, 9 |

Figure 35:
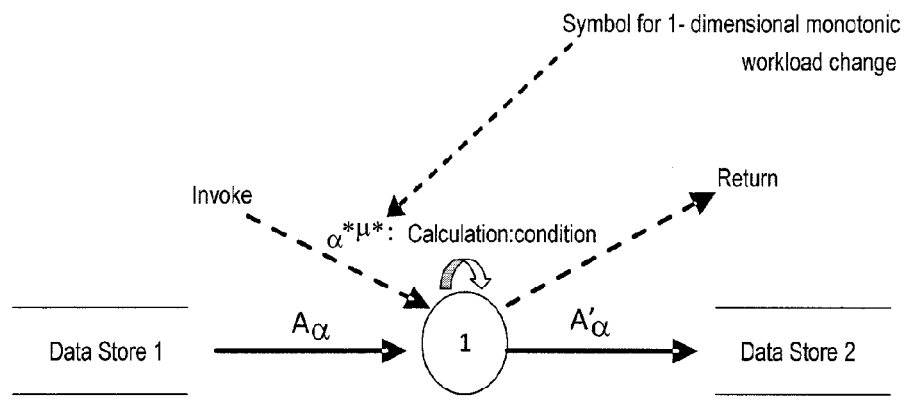
FIG. 35 shows an example of a 1-dimensional monotonic workload symbol, functional decomposition view.

FIG. 35 shows a 1-dimensional monotonic workload symbol in functional decomposition view. If a one-dimensional workload is monotonic, then that information is given to MPfd with the symbols shown in FIG. 35. The symbol $\alpha^{*\mu*}$ means that the work (represented as the work within a loop) changes monotonically and that this workload effect applies to vector "A". That is, $\alpha^{*\mu*}$ means that index alpha is intended to access the data monotonically. Thus the alpha is the loop index and the *mu* is the intended use of the data accessed using the alpha index.

Figure 36:
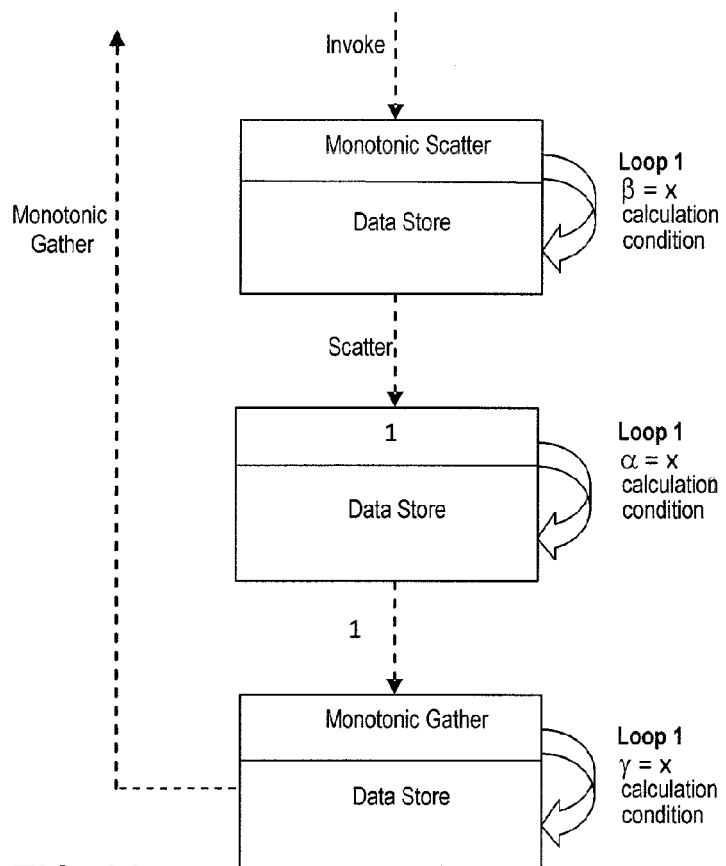
FIG. 36 shows an example of a 1-dimensional monotonic workload symbol, finite state machine view.

Note that, for brevity, the loop is defined by (index:calculation:condition) where the index is the loop index plus any clarifying symbol by the loop index, the calculation is the next index-value calculation, and the condition is the loop-ending condition. FIG. 36 shows a 1-dimensional monotonic workload symbol in finite state machine view. Table 5, below, shows a two-dimensional version of the monotonic workload-changing mesh.

TABLE 5

NON-NAIVE WORK 2-DIMENSIONAL DISTRIBUTION OF A MONOTONIC WORKLOAD CHANGING PROBLEM

| | X1 | | X2 | |
|---|---|---|---|---|
| Y1 | 1, 64, 2, 63 | 3, 62, 4, 61 | 5, 60, 6, 59 | 7, 58, 8, 57 |
| | 9, 56, 10, 55 | 11, 54, 12, 53 | 13, 52, 14, 51 | 15, 50, 16, 49 |
| Y2 | 17, 48, 18, 47 | 19, 46, 20, 45 | 21, 44, 22, 43 | 23, 42, 24, 41 |
| | 25, 40, 26, 39 | 27, 38, 28, 37 | 29, 36, 30, 35 | 31, 34, 32, 33 |

If a two-dimensional workload is monotonic then that information is given to MPfd with the following symbols. The symbol means that the work (represented as the work within a loop) changes monotonically and that this workload effect applies to vector "A".

Figure 37:
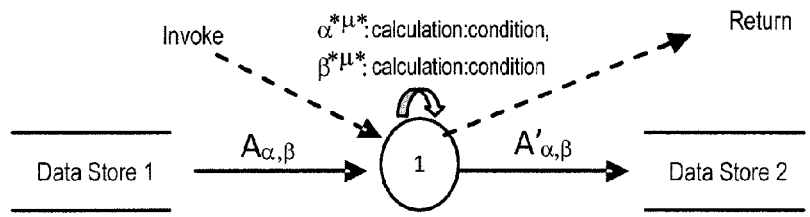
FIG. 37 shows an example of a 2-dimensional monotonic workload symbol, functional decomposition view.
Figure 38:
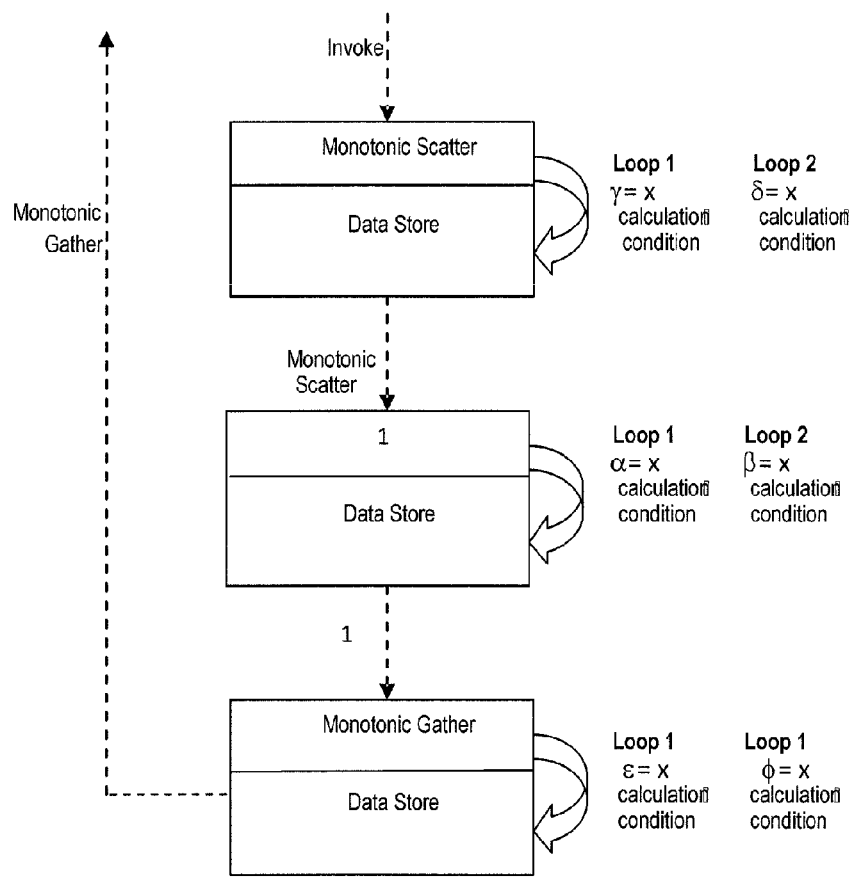
FIG. 38 shows an example of a 2-dimensional monotonic workload symbol, finite state machine view.

FIG. 37 shows a 2-dimensional monotonic workload symbol in functional decomposition view, and FIG. 38 shows a 2-dimensional monotonic workload symbol in finite state machine view.

Table 6, below, shows a three-dimensional version of the monotonic workload-changing mesh.

TABLE 6

NON-NAIVE WORK 2-DIMENSIONAL DISTRIBUTION OF A MONOTONIC WORKLOAD CHANGING PROBLEM

| | X1 | | X2 | |
|---|---|---|---|---|
| Z1 | | | | |
| Y1 | 1, 256, 2, 255 | 3, 254, 4, 253 | 5, 252, 6, 251 | 7, 250, 8, 249 |
| | 9, 248, 10, 247 | 11, 246, 12, 245 | 13, 244, 14, 243 | 15, 242, 16, 241 |
| Y2 | 17, 240, 18, 239 | 19, 238, 20, 237 | 21, 236, 22, 235 | 23, 234, 24, 233 |
| | 25, 232, 26, 231 | 27, 230, 28, 229 | 29, 228, 30, 227 | 31, 226, 32, 225 |

TABLE 6-continued

NON-NAIVE WORK 2-DIMENSIONAL DISTRIBUTION OF A MONOTONIC WORKLOAD CHANGING PROBLEM

| | X1 | | X2 | |
|---|---|---|---|---|
| Z2 | | | | |
| Y1 | 33, 224, 34, 223 | 35, 222, 36, 221 | 37, 220, 38, 219 | 39, 218, 40, 217 |
| | 41, 216, 42, 215 | 43, 214, 44, 213 | 45, 212, 46, 211 | 47, 210, 48, 209 |
| Y2 | 49, 208, 50, 207 | 51, 206, 52, 205 | 53, 204, 54, 203 | 55, 202, 56, 201 |
| | 57, 200, 58, 199 | 59, 198, 60, 197 | 61, 196, 62, 195 | 63, 194, 64, 193 |
| Z3 | | | | |
| Y1 | 65, 192, 66, 191 | 67, 190, 68, 189 | 69, 188, 70, 187 | 71, 186, 72, 185 |
| | 73, 184, 74, 183 | 75, 182, 76, 181 | 77, 180, 78, 179 | 79, 178, 80, 177 |
| Y2 | 81, 176, 82, 175 | 83, 174, 84, 173 | 85, 172, 86, 171 | 87, 170, 88, 169 |
| | 89, 168, 90, 167 | 91, 166, 92, 165 | 93, 164, 94, 163 | 95, 162, 96, 161 |
| Z4 | | | | |
| Y1 | 97, 160, 98, 159 | 99, 158, 100, 157 | 101, 156, 102, 155 | 103, 154, 104, 153 |
| | 105, 152, 106, 151 | 107, 150, 108, 149 | 109, 148, 110, 147 | 111, 146, 112, 145 |
| Y2 | 113, 144, 114, 143 | 115, 142, 116, 141 | 117, 140, 118, 139 | 119, 138, 120, 137 |
| | 121 136, 122, 135 | 123, 134, 124, 133 | 125, 132, 126, 131 | 127, 130, 128, 129 |

Figure 3:
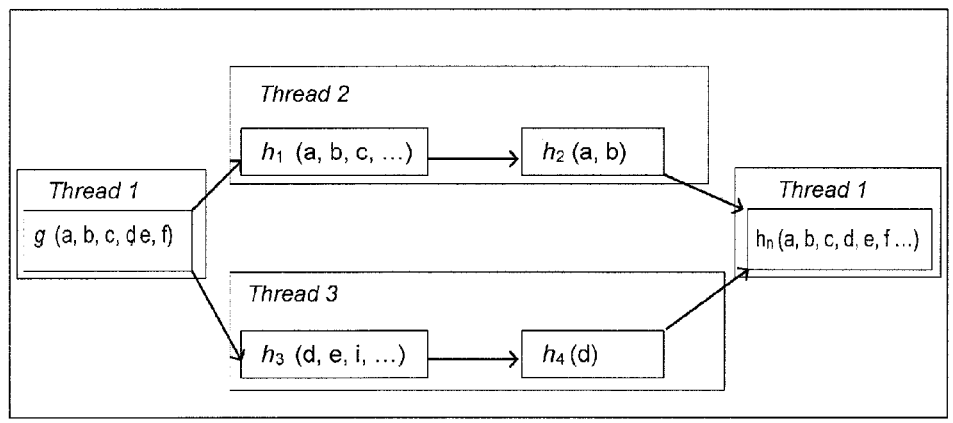
FIG. 3 shows an example of multiple threads from decomposition of function with dissimilar parameters.
Figure 39:
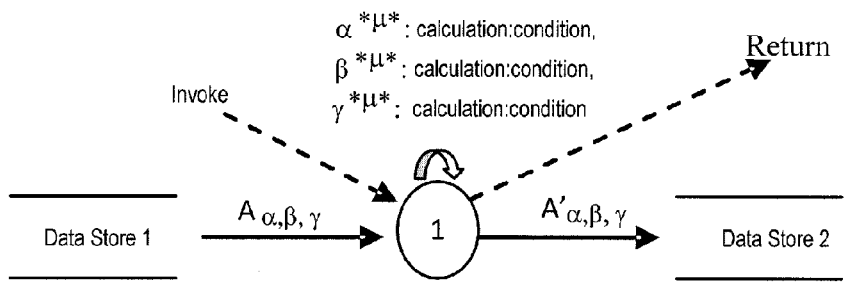
FIG. 39 shows an example of a 3-dimensional monotonic workload symbol, functional decomposition view.
Figure 40:
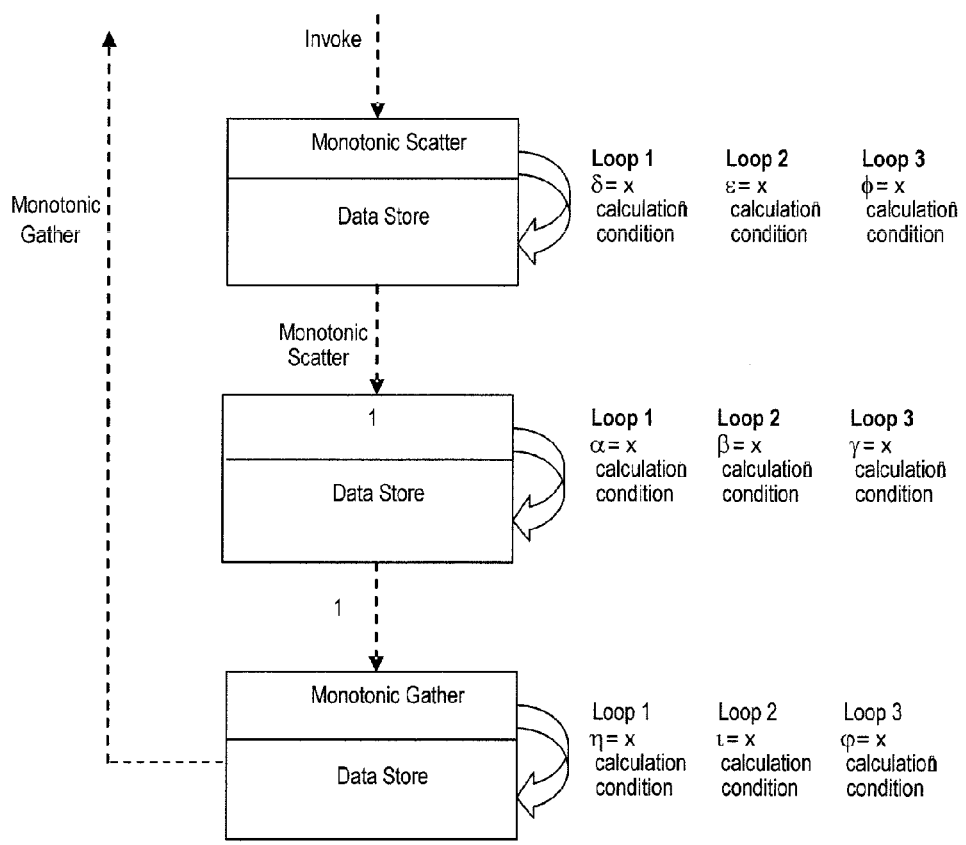
FIG. 40 shows an example of a 3-dimensional monotonic workload symbol, finite state machine view.

FIG. 39 3-dimensional monotonic workload symbol in functional decomposition view, and FIG. 40 shows a 3-dimensional monotonic workload symbol in finite state machine view. If a three-dimensional workload is monotonic then that information is given to MPfd with the symbol shown in FIG. 39. There are three symbols attached to the three loops ($\alpha^{*\mu*}$, $\beta^{*\mu*}$, and $\gamma^{*\mu*}_{\cdot}$). These symbols mean that the work (represented as the work within a loop) changes monotonically and that this workload effect applies to vector "A".

Particle Use Model

Concept: Particles are used to define discrete objects that move about a vector or array.

Use: Modeling physical phenomenon, atoms, ray-traces, fluids, etc.

Example Use Computational fluid dynamics, changing image analysis.

Parallel Issue: Information sharing.

Action: Determine what to cross communicate.

A one-dimensional particle exchange with Cartesian topology generates the following version (shown in Tables 7 and 8) of a left-right exchange.

TABLE 7

INITIAL 1-DIMENSIONAL CONDITION BEFORE LEFT-RIGHT EXCHANGE
(Cartesian Topology)

| | Node # | | | |
|---|---|---|---|---|
| | Node$_1$ | Node$_2$ | Node$_3$ | Node$_4$ |
| Work Elements | 1, 2, 3, 4 | 5, 6, 7, 8 | 9, 10, 11, 12 | 13, 14, 15, 16 |

TABLE 8

1-DIMENSIONAL CONDITION AFTER ONE LEFT-RIGHT EXCHANGE

| | Node # | | | |
|---|---|---|---|---|
| | Node$_1$ | Node$_2$ | Node$_3$ | Node$_4$ |
| Work Elements | 1, 2, 3, 5 | 4, 6, 7, 9, | 8, 10, 11, 13 | 12, 14, 15, 16 |

A one-dimensional particle exchange with a Ring topology generates the following version (shown in Table 9 and 10) of a left-right exchange.

TABLE 9

INITIAL 1-DIMENSIONAL CONDITION BEFORE LEFT-RIGHT EXCHANGE
(Ring Topology)

| | Node # | | | |
|---|---|---|---|---|
| | Node$_1$ | Node$_2$ | Node$_3$ | Node$_4$ |
| Work Elements | 1, 2, 3, 4 | 5, 6, 7, 8 | 9, 10, 11, 12 | 13, 14, 15, 16 |

TABLE 10

1-DIMENSIONAL CONDITION AFTER ONE LEFT-RIGHT EXCHANGE
(Ring Topology)

| | Node # | | | |
|---|---|---|---|---|
| | Node$_1$ | Node$_2$ | Node$_3$ | Node$_4$ |
| Work Elements | 16, 2, 3, 5 | 4, 6, 7, 9 | 8, 10, 11, 13 | 12, 14, 15, 1 |

Note:
Node$_4$ edge information wraps around to node$_1$ and node$_1$ wraps around to node$_4$ in the Ring topology version of the left-right exchange.

Figure 41:
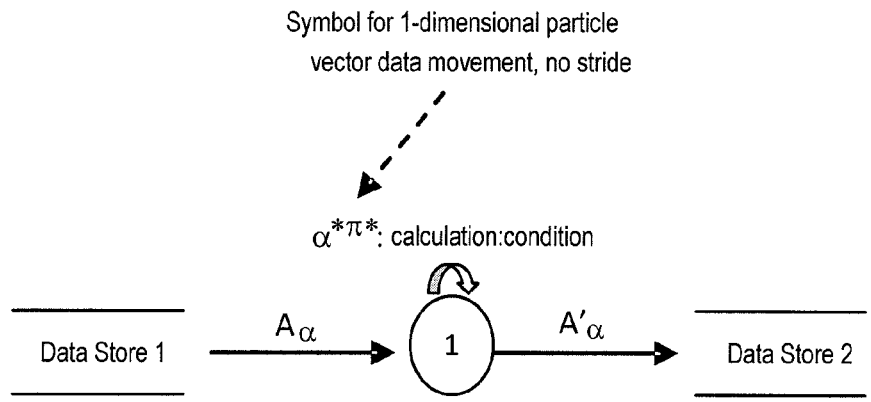
FIG. 41 shows an example of a left-right exchange symbol—no stride, functional decomposition view.
Figure 42:
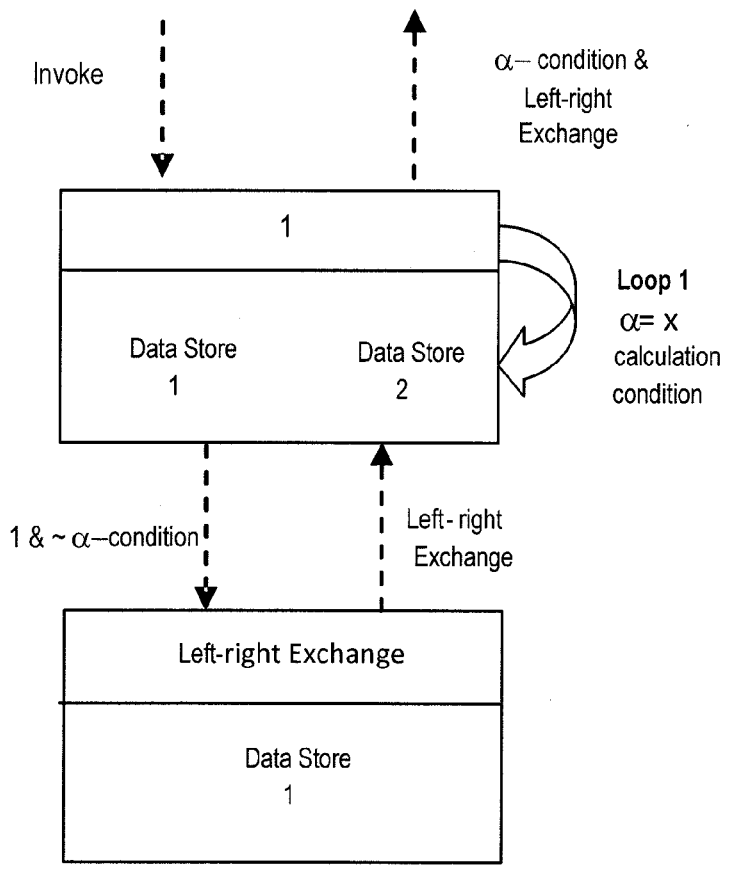
FIG. 42 shows an example of a left-right exchange symbol—no stride, finite state machine view.

FIG. 41 (functional decomposition view) depicts a left-right exchange symbol (*π*) indicating no stride, also shown in the finite state machine view of FIG. 42. If a one-dimensional vector is used to depict particles then the *π* symbol shown in FIG. 41 is used.

Figure 43:
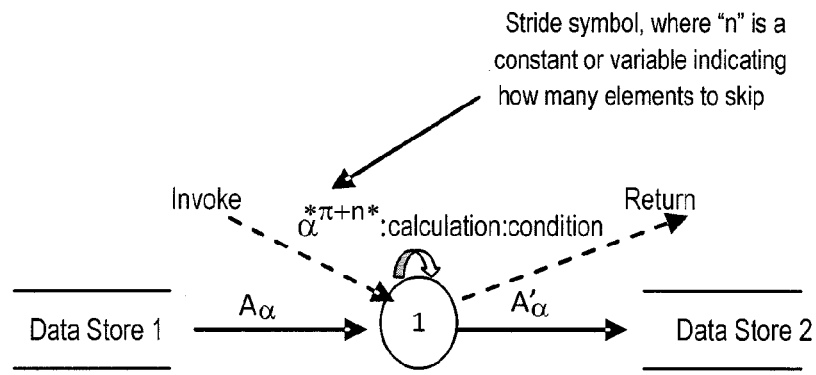
FIG. 43 shows an example of a left-right exchange—with stride, functional decomposition view.
Figure 44:
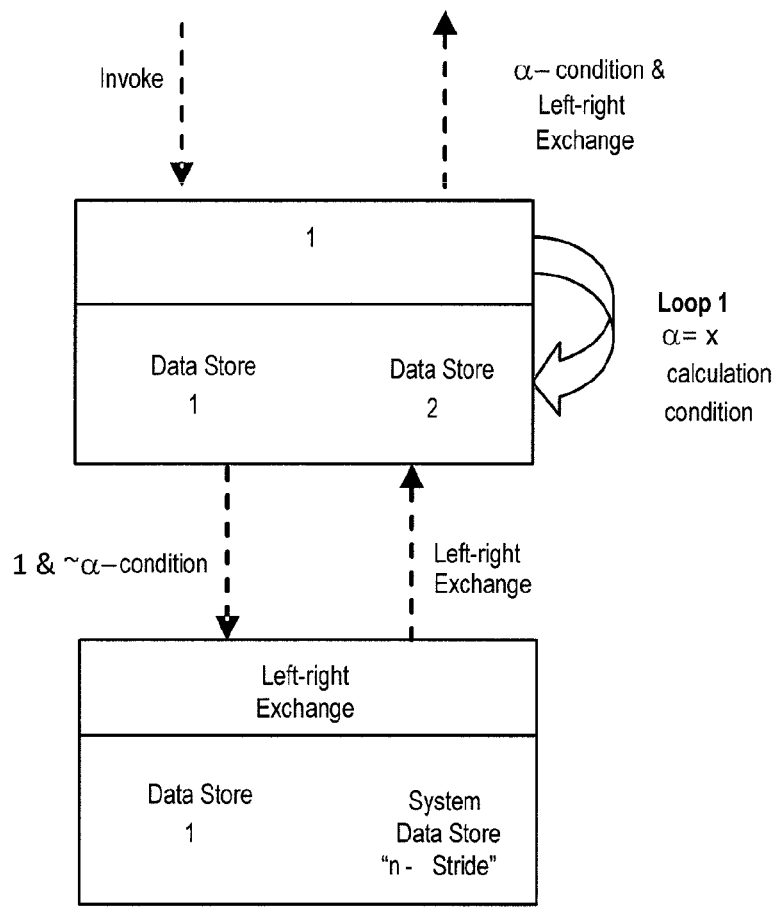
FIG. 44 shows an example of a left-right exchange—with stride, finite state machine view.

If the processing of the vector skips one or more elements (called striding) then less data needs to be exchanged. The index calculation on the loop indicator can be modified to *π+n* to indicate striding. FIG. 43 depicts a left-right exchange—with stride in a functional decomposition view, and FIG. 44 depicts a left-right exchange in finite state machine view.

A two-dimensional particle exchange with Cartesian topology, generates the following version (shown in Table 11 below) of a next-neighbor exchange (edge-number exchange only).

TABLE 11

INITIAL 2-DIMENSIONAL CONDITION BEFORE NEXT-NEIGHBOR EXCHANGE (CARTESIAN TOPOLOGY)

| | X1 | | X2 | |
|---|---|---|---|---|
| Y1 | 1, 2, 3, 4 | 5, 6, 7, 8 | 9, 10, 11, 12 | 13, 14, 15, 16 |
| | 17, 18, 19, 20 | 21, 22, 23, 24 | 25, 26, 27, 28 | 29, 30, 31, 32 |
| Y2 | 33, 34, 35, 36 | 37, 38, 39, 40 | 41, 42, 43, 44 | 45, 46, 47, 48 |
| | 49, 50, 51, 52 | 53, 54, 55, 56 | 57, 58, 59, 60 | 61, 62, 63, 64 |

TABLE 12

2-DIMENSIONAL CONDITION AFTER ONE NEXT-NEIGHBOR EXCHANGE (CARTESIAN TOPOLOGY)

|    | X1 | | X2 | |
|----|----|----|----|----|
| Y1 | 1, 2, 3, 4 | 5, 6, 7, 9 | 8, 10, 11, 12 | 13, 14, 15, 16 |
|    | 33, 34, 35, 36 | 37, 38, 39, (25, 41, 40) | (24, 41, 40), 42, 43, 44 | 45, 46, 47, 48 |
| Y2 | 17, 18, 19, 20 | 21, 22, 23, (24, 25, 41) | (40, 24, 25), 26, 27, 28 | 29, 30, 31, 32 |
|    | 49, 50, 51, 52 | 53, 54, 55, 57 | 56, 58, 59, 60 | 61, 62, 63, 64 |

Note:
Parenthesis indicates that the information here is overlaid such that the underlying code treats it as if it were adjacent memory.

A two-dimensional particle exchange with Cylindrical topology generates the following version (shown in Tables 13 and 14) of a next-neighbor exchange (edge-number exchange only).

TABLE 13

INITIAL 2-DIMENSIONAL CONDITION BEFORE NEXT-NEIGHBOR EXCHANGE (CYLINDRICAL TOPOLOGY)

|    | X1 | | X2 | |
|----|----|----|----|----|
| Y1 | 1, 2, 3, 4 | 5, 6, 7, 8 | 9, 10, 11, 12 | 13, 14, 15, 16 |
|    | 17, 18, 19, 20 | 21, 22, 23, 24 | 25, 26, 27, 28 | 29, 30, 31, 32 |
| Y2 | 33, 34, 35, 36 | 37, 38, 39, 40 | 41, 42, 43, 44 | 45, 46, 47, 48 |
|    | 49, 50, 51, 52 | 53, 54, 55, 56 | 57, 58, 59, 60 | 61, 62, 63, 64 |

TABLE 14

2-DIMENSIONAL CONDITION AFTER ONE NEXT-NEIGHBOR EXCHANGE (CYLINDRICAL TOPOLOGY)

|    | X1 | | X2 | |
|----|----|----|----|----|
| Y1 | 49, 50, 51, 52 | 53, 54, 55, (9, 56, 57) | (8, 57, 56), 58, 59, 60 | 61, 62, 63, 64 |
|    | 33, 34, 35, 36 | 37, 38, 39, (25, 41, 40) | (24, 41, 40), 42, 43, 44 | 45, 46, 47, 48 |
| Y2 | 17, 18, 19, 20 | 21, 22, 23, (24, 25, 41) | (40, 24, 25), 26, 27, 28 | 29, 30, 31, 32 |
|    | 1, 2, 3, 4 | 5, 6, 7, (8, 57, 9) | (56, 9, 8), 10, 11, 12 | 13, 14, 15, 16 |

A two-dimensional particle exchange with Toroid topology generates the version of a next-neighbor exchange (edge-number exchange only) shown in Tables 15 and 16 below.

TABLE 15

INITIAL 2-DIMENSIONAL CONDITION BEFORE NEXT-NEIGHBOR EXCHANGE (TOROID TOPOLOGY)

|    | X1 | | X2 | |
|----|----|----|----|----|
| Y1 | 1, 2, 3, 4 | 5, 6, 7, 8 | 9, 10, 11, 12 | 13, 14, 15, 16 |
|    | 17, 18, 19, 20 | 21, 22, 23, 24 | 25, 26, 27, 28 | 29, 30, 31, 32 |
| Y2 | 33, 34, 35, 36 | 37, 38, 39, 40 | 41, 42, 43, 44 | 45, 46, 47, 48 |
|    | 49, 50, 51, 52 | 53, 54, 55, 56 | 57, 58, 59, 60 | 61, 62, 63, 64 |

TABLE 16

2-DIMENSIONAL CONDITION AFTER ONE NEXT-NEIGHBOR EXCHANGE (Toroid Topology)

|    | X1 | | X2 | |
|----|----|----|----|----|
| Y1 | (49, 16), 50, 51, 52 | 53, 54, 55, (9, 56, 57) | (8, 57, 56), 58, 59, 60 | 61, 62, 63, (64, 1) |
|    | (33, 32), 34, 35, 36 | 37, 38, 39, (25, 41, 40) | (24, 41, 40), 42, 43, 44 | 45, 46, 47, (48, 17) |
| Y2 | (17, 48), 18, 19, 20 | 21, 22, 23, (24, 25, 41) | (40, 24, 25), 26, 27, 28 | 29, 30, 31, (32, 33) |
|    | (1, 64), 2, 3, 4 | 5, 6, 7, (8, 57, 9) | (56, 9, 8), 10, 11, 12 | 13, 14, 15, (16, 49) |

Figure 45:
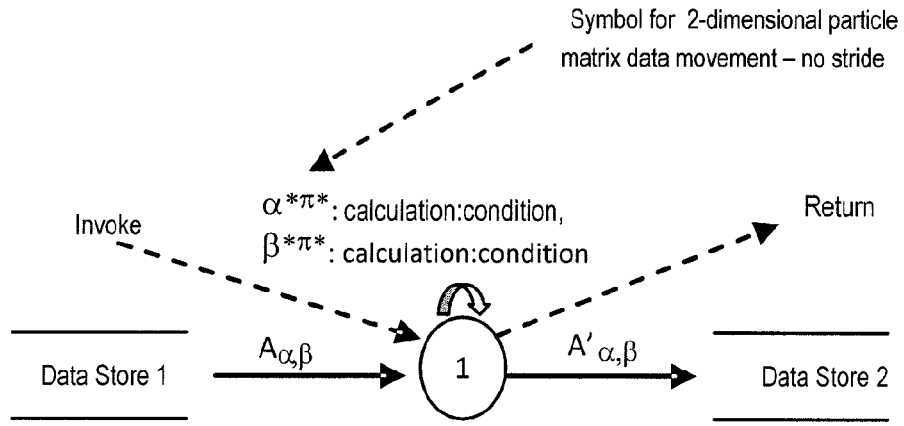
FIG. 45 shows an example of a next-neighbor exchange symbol—no stride, functional decomposition view.
Figure 46:
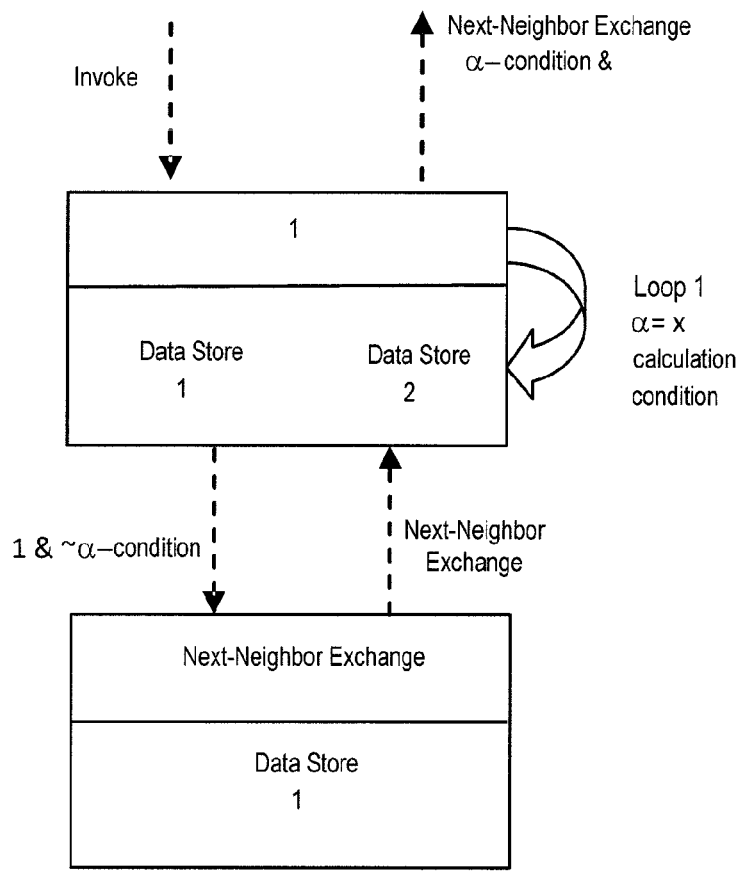
FIG. 46 shows an example of a next-neighbor exchange—no stride, finite state machine view.
Figure 47:
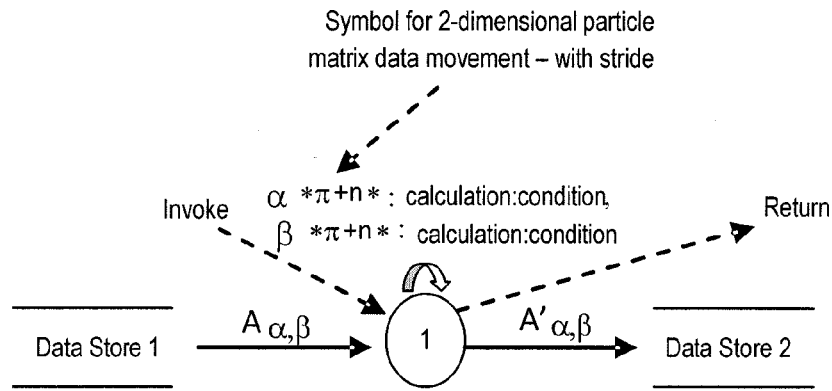
FIG. 47 shows an example of a next-neighbor exchange symbol—with stride, functional decomposition view.
Figure 48:
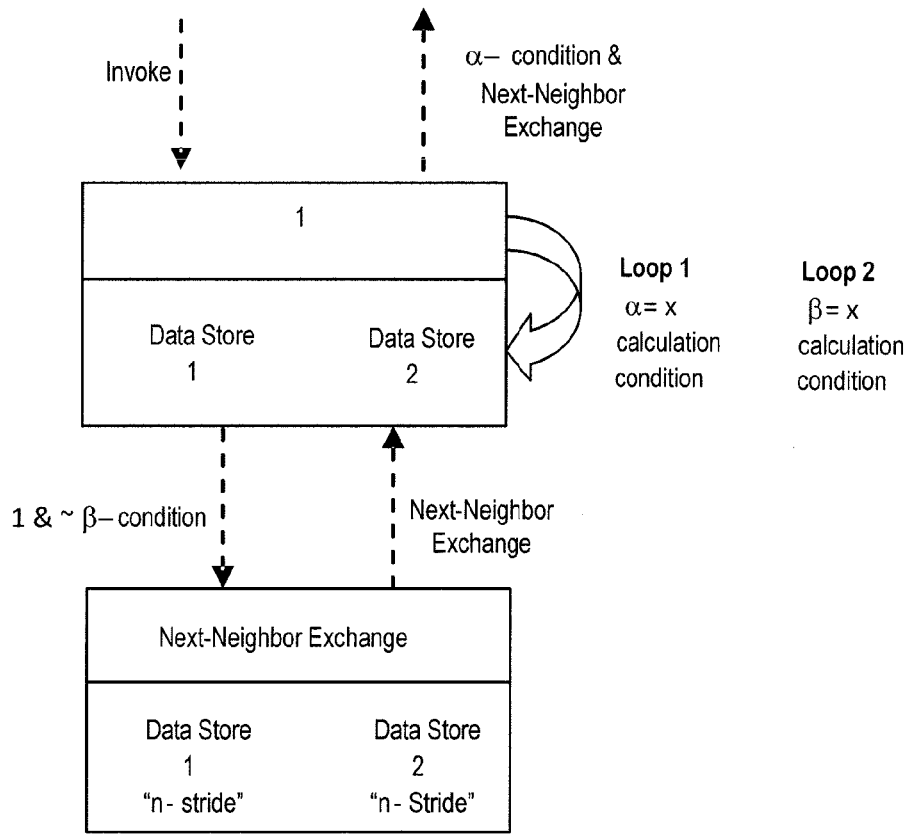
FIG. 48 shows an example of a next-neighbor exchange—with stride, finite state machine view.

FIG. 45 shows a next-neighbor exchange—no stride, in functional decomposition view; FIG. 46 shows a next-neighbor exchange—no stride, in finite state machine view; FIG. 47 shows a next-neighbor exchange symbol—with stride, in functional decomposition view; and FIG. 48 shows a next-neighbor exchange—with stride, in finite state machine view. If a two-dimensional matrix is used to depict particles then the symbol shown in FIGS. 45/47 is used. A new state is automatically added when the system recognizes that a next neighbor exchange is to be used. The data exchange is modified with the "stride" information indicating how much data to skip with each exchange.

A three-dimensional particle exchange with Cartesian topology generates the version of a next-neighbor exchange (edge-number exchange only) shown in Tables 17 and 18, below.

TABLE 17

INITIAL 3-DIMENSIONAL CONDITIONS BEFORE NEXT-NEIGHBOR EXCHANGE (CYLINDRICAL TOPOLOGY)

|    | X1 | | X2 | |
|----|----|----|----|----|
| Z1 | | | | |
| Y1 | 1, 2, 3, 4 | 5, 6, 7, 8 | 9, 10, 11, 12 | 13, 14, 15, 16 |
|    | 17, 18, 19, 20 | 21, 22, 23, 24 | 25, 26, 27, 28 | 29, 30, 31 32 |
| Y2 | 33, 34, 35, 36 | 37, 38, 39, 40 | 41, 42, 43, 44 | 45, 46, 47, 48 |
|    | 49, 50, 51, 52 | 53, 54, 55, 56 | 57, 58, 59, 60 | 61, 62, 63, 64 |
| Z2 | | | | |
| Y1 | 65, 66, 67, 68 | 69, 70, 71, 72 | 73, 74, 75, 76 | 77, 78, 79, 80 |
|    | 81, 82, 83, 84 | 85, 86, 87, 88 | 89, 90, 91, 92 | 93, 94, 95, 96 |
| Y2 | 97, 98, 99, 100 | 101, 102, 103, 104 | 105, 106, 107, 108 | 109, 110, 111, 112 |
|    | 113, 114, 115, 116 | 117, 118, 119, 120 | 121, 122, 123, 124 | 125, 126, 127, 128 |
| Z3 | | | | |
| Y1 | 129, 130, 131, 132 | 133, 134, 135, 136 | 137, 138, 139, 140 | 141, 142, 143, 144 |
|    | 145, 146, 147, 148 | 149, 150, 151, 152 | 153, 154, 155, 156 | 157, 158, 159, 160 |
| Y2 | 161, 162, 163, 164 | 165, 166, 167, 168 | 169, 170, 171, 172 | 173, 174, 175, 176 |
|    | 177, 178, 179, 180 | 181, 182, 183, 184 | 185, 186, 187, 188 | 189, 190, 191, 192 |

TABLE 17-continued

INITIAL 3-DIMENSIONAL CONDITIONS BEFORE NEXT-NEIGHBOR EXCHANGE (CYLINDRICAL TOPOLOGY)

| | | X1 | | X2 | |
|---|---|---|---|---|---|
| Z4 | | | | | |
| | Y1 | 193, 194, 195, 196 | 197, 198, 199, 200 | 201, 202, 203, 204 | 205, 206, 207, 208 |
| | | 209, 210, 211, 212 | 213, 214, 215, 216 | 217, 218, 219, 220 | 221, 222, 223, 224 |
| | Y2 | 225, 226, 227, 228 | 229, 230, 231, 232 | 233, 234, 235, 236 | 237, 238, 239, 240 |
| | | 241, 242, 243, 244 | 245, 246, 247, 248 | 249, 250, 251, 252 | 253, 254, 255, 256 |

TABLE 18

DIMENSIONAL CONDITION AFTER ONE NEXT-NEIGHBOR EXCHANGE (Cartesian Topology)

| | | X1 | | X2 | |
|---|---|---|---|---|---|
| Z1 | | | | | |
| | Y1 | 65, 66, 67, 68 | 69, 70, 71, (9, 72) | (8, 73), (10, 74), (11, 75), (12, 76) | (13, 77), (14, 78), (15, 79), (16, 80) |
| | | 81, 82, 83, 84 | 85, 86, 87, (25, 40, 41, 88) | (24, 40, 41, 89), (42, 90), (43, 91), (44, 92) | (45, 93), (46, 94), 47, 95), (48, 96) |
| | Y2 | (17, 97), (18, 98), (19, 99), (20, 100) | (21, 101), (22, 102), (23, 103), (24, 25, 41, 104) | (24, 25, 40, 105), (26, 106), (27, 107), (28, 108) | (29, 109), (30, 110), (31, 111), (32, 112) |
| | | 113, 114, 115, 116 | 117, 118, 119, (57, 120) | (56, 121), 122, 123, 124 | 125, 126, 127, 128 |
| Z2 | | | | | |
| | Y1 | (65, 1, 129), (66, 2, 130), (67, 3, 131), (68, 4, 132) | (69, 5, 133), (70, 6, 134), (71, 7, 135), (73, 8, 136) | (72, 9, 137), (10, 74, 138), (75, 11, 139), (76, 12, 140) | (77, 13, 141), (78, 14, 142), (79, 15, 143), (80, 16, 144) |
| | | (97, 17, 129)(98, 18, 130), (99, 19, 131), (100, 20, 132) | (101, 21, 133), (102, 22, 134), (103, 23, 135), (104, 89, 105, 24, 136) | (104, 105, 88, 25, 153), (106, 26, 154), (107, 27, 155), (108, 28, 156) | (109, 29, 157), (110, 30, 158), (111, 31, 159), (112, 32, 160) |
| | Y2 | (81, 33, 161), (82, 34, 162), (83, 35, 163), (84, 36, 164) | (85, 37, 165), (86, 38, 166), (87, 39, 167), (88, 40, 168, 89, 105) | (89, 104, 88, 41, 169), (90, 42, 170), (91, 43, 171), (92, 44, 172) | (93, 45, 173), (94, 46, 174), (95, 47, 175), (96, 48, 176) |
| | | (113, 49, 177), (114, 50, 178), (115, 51, 179), (116, 52, 180) | (117, 53, 181), (118, 54, 182), (119, 55, 183), (121, 56, 184) | (120, 57, 185), (122, 58, 186), (123, 59, 187), (124, 60, 188) | (125, 61, 189), (126, 62, 190), (127, 191), (128, 64, 192) |
| Z3 | | | | | |
| | Y1 | (129, 65, 193), (130, 66, 194), (131, 67, 195), (132, 68, 196) | (133, 69, 197), (134, 70, 198), (135, 71, 199), (137, 72, 200) | (136, 73, 201), (138, 74, 202), (139, 75, 203), (140, 76, 204) | (141, 77, 205), (142, 78, 206), (143, 79, 207), (144, 80, 208) |
| | | (161, 81, 209), (162, 82, 210), (163, 83, 211), (164, 84, 212) | (165, 85, 213), (166, 86, 214), (167, 87, 215), (168, 153, 169, 88, 216) | (169, 152, 168, 89, 217), (170, 90, 218), (171, 91, 219), (172, 92, 220) | (173, 93, 221), (174, 94, 222), (175, 95, 223), (176, 96, 223) |
| | Y2 | (145, 97, 225), (146, 98, 226), (147, 99, 227), (148, 100, 228) | (149, 101, 229), (150, 102, 230), (151, 103, 231), (152, 104, 232, 153, 169) | (153, 152, 168, 105, 233), (154, 106, 234), (155, 107, 235), (156, 108, 236) | (157, 109, 237), (158, 110, 238), (159, 111, 239), (160, 112, 240) |
| | | (177, 113, 241), (178, 114, 242), (179, 115, 243), (180, 116, 244) | (181, 117, 245), (182, 118, 246), (183, 119, 247), (185, 120, 248) | (184, 121, 249), (186, 122, 249), (187, 123, 250), (188, 124, 251) | (189, 125, 252), (190, 126, 253), (191, 127, 254), (192, 128, 255) |

TABLE 18-continued

DIMENSIONAL CONDITION AFTER ONE NEXT-NEIGHBOR EXCHANGE
(Cartesian Topology)

|  | X1 | | X2 | |
| --- | --- | --- | --- | --- |
| Z4 | | | | |
| Y1 | (193, 129), | (197, 133), | (200, 137), | (205, 141), |
|  | (194, 130), | (198, 134), | (202, 138), | (206, 142), |
|  | (195, 131), | (199, 135), | (203, 139), | (207, 143), |
|  | (196, 132) | (201, 136) | (204, 140) | (208, 144) |
|  | (225, 145), | (229, 149), | (233, 232, 216, 153), | (237, 157), |
|  | (226, 146), | (230, 150), | (234, 154), | (238, 158), |
|  | (227, 147), | (231, 151), | (235, 155), | (239, 159), |
|  | (228, 148) | (232, 217, 233, 152) | (236, 156) | (240, 160) |
| Y2 | (209 161), | (213, 165), | (217, 232, 216, 169), | (221, 173), |
|  | (210, 162), | (214, 166), | (218, 170), | (222, 174), |
|  | (211, 163), | (215, 167), | (219, 171), | (223, 175), |
|  | (212, 164) | (216, 168, 217, 233) | (220, 172) | (224, 176) |
|  | (241, 177), | (245, 181), | (248, 185), | (253, 189), |
|  | (242, 178), | (246, 182), | (250, 186), | (254, 190), |
|  | (243, 179), | (247, 183), | (251, 187), | (255, 191), |
|  | (244, 180) | (249, 184) | (252, 188) | (256, 192) |

Figure 49:
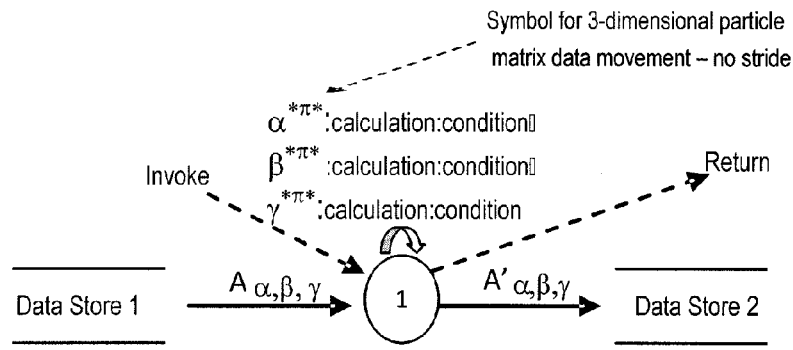
FIG. 49 shows an example of a 3-dimensional next-neighbor exchange symbol—no stride, functional decomposition view.
Figure 50:
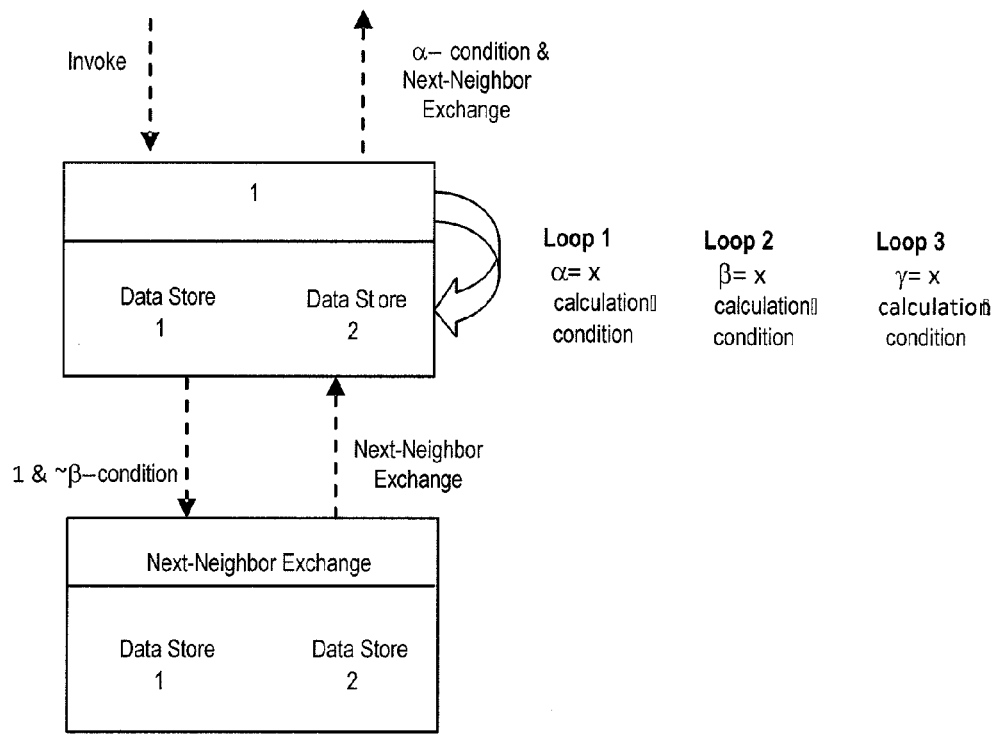
FIG. 50 shows an example of a 3-dimensional next-neighbor exchange—no stride, finite state machine view.
Figure 51:
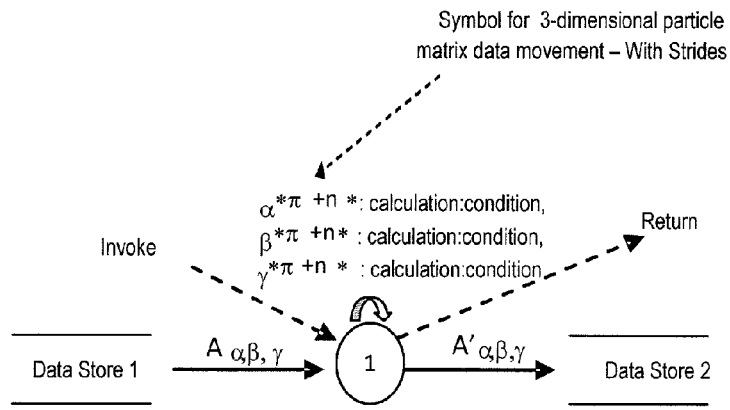
FIG. 51 shows an example of a 3-dimensional next-neighbor exchange symbol—with stride, functional decomposition view.
Figure 52:
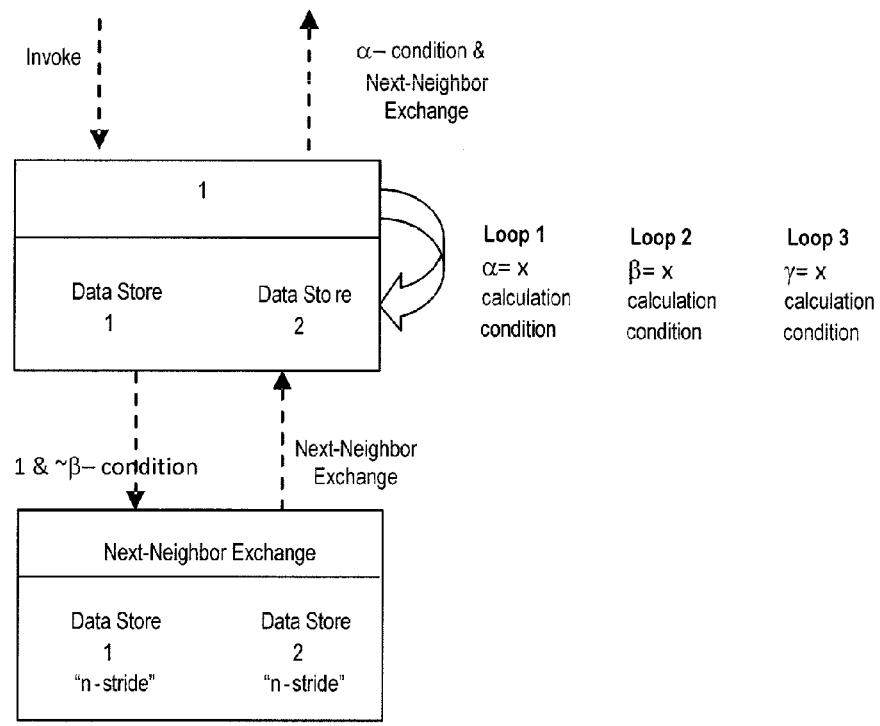
FIG. 52 shows an example of a 3-dimensional next-neighbor exchange—with stride, finite state machine view.

FIG. 49 shows a 3-dimensional next-neighbor exchange symbol [* *] indicating no stride, in functional decomposition view; FIG. 50 shows a 3-dimensional next-neighbor exchange—no stride, in finite state machine view; FIG. 51 shows a 3-dimensional next-neighbor exchange—with stride, in functional decomposition view; and FIG. 52 shows a 3-dimensional next-neighbor exchange—with stride, in finite state machine view. If a three-dimensional matrix is used to depict particles, then the symbol shown in FIG. 49 is used.

Figure 53:
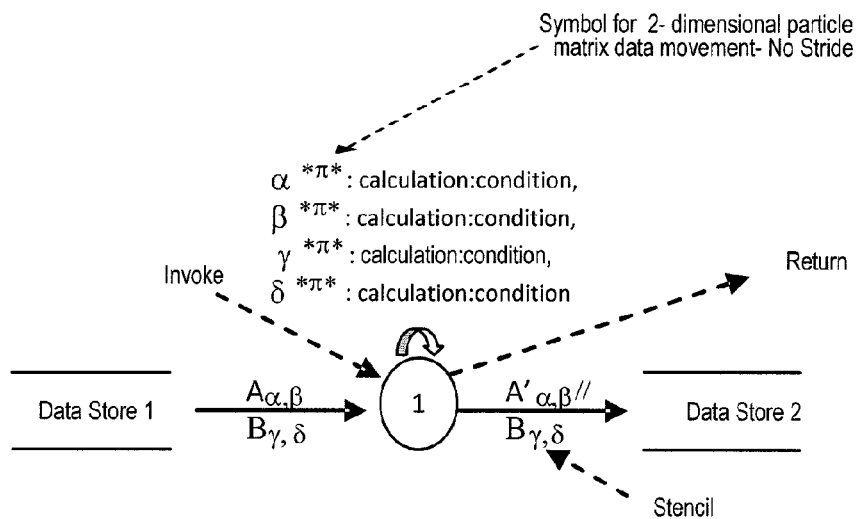
FIG. 53 shows an example of a 2-dimensional matrix with 2-dimensional stencil for 2-d next-n-neighbor exchange symbol—no stride, functional decomposition view.
Figure 54:
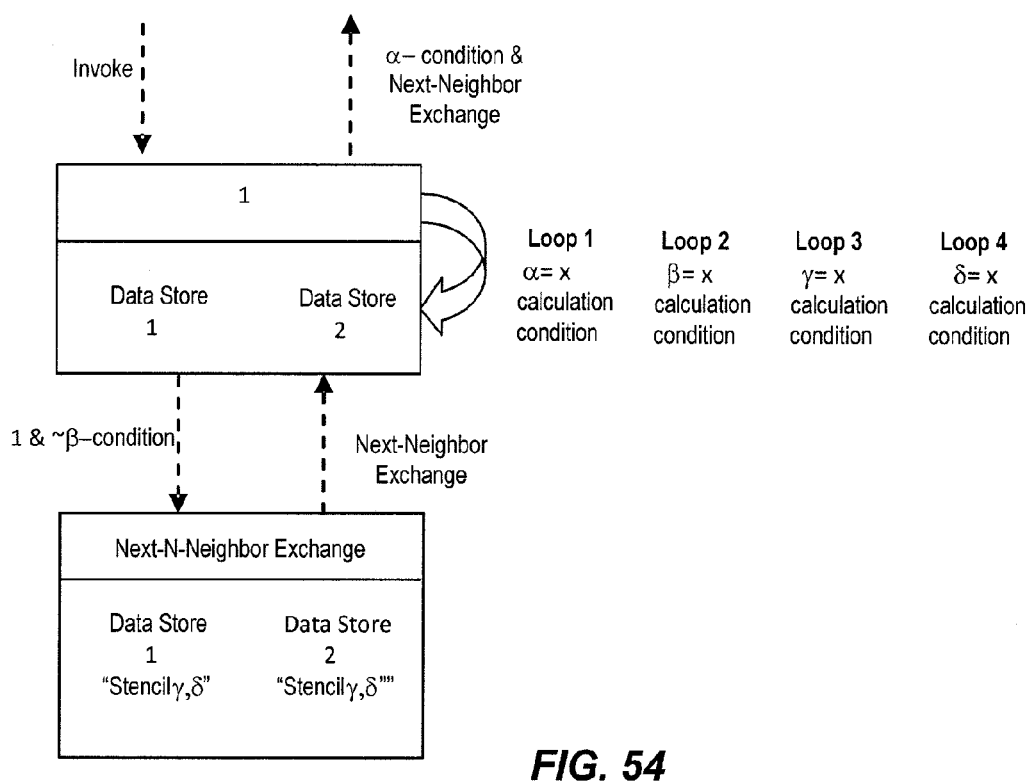
FIG. 54 shows an example of a 2-dimensional matrix with 2-dimensional stencil for 2-d next-n-neighbor exchange—no stride, finite state machine view.
Figure 55:
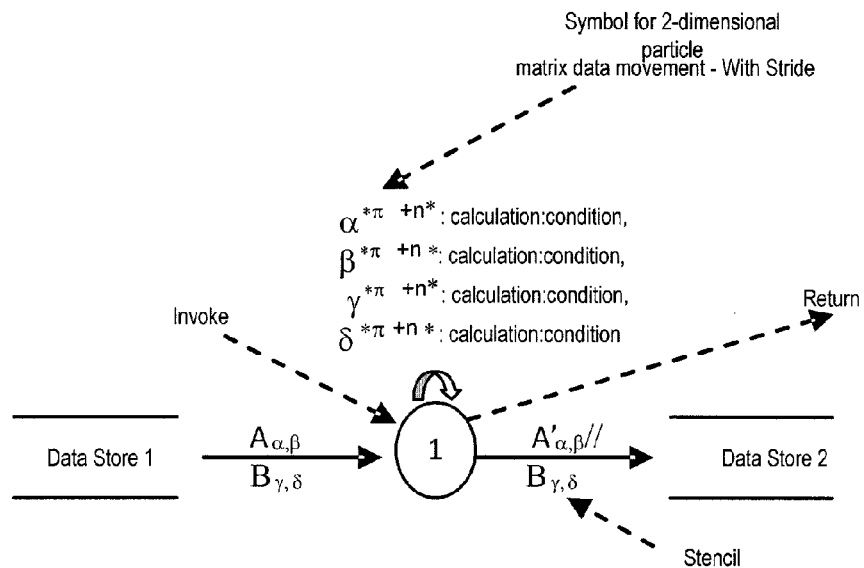
FIG. 55 shows an example of a 2-dimensional matrix with 2-dimensional stencil for 2-d next-n-neighbor exchange symbol—with stride, functional decomposition view.

FIG. 53 shows a 2-dimensional matrix with 2-dimensional stencil for 2-d next-n-neighbor exchange symbol—no stride, in functional decomposition view; FIG. 54 shows a 2-dimensional matrix with 2-dimensional stencil for 2-d next-n-neighbor exchange—no stride, in finite state machine view; and FIG. 55 shows a 2-dimensional matrix with 2-dimensional stencil for 2-d next-n-neighbor exchange symbol—with stride, in functional decomposition view. The next-neighbor exchange can be extended to a next-n-neighbor exchange. Frequently, the depth of the exchange is a function of some size of the stencil that is applied to it. The exchange will consist of using the number of elements along the dimension of the exchange found in the stencil. If the number of elements is greater than the discretization size then the data must be shared across multiple nodes. Since the stencil is itself a vector or matrix, the symbol for a two-dimensional matrix with a two-dimensional stencil (shown in FIG. 53) can be used to generate a next-n-neighbor exchange.

Figure 56:
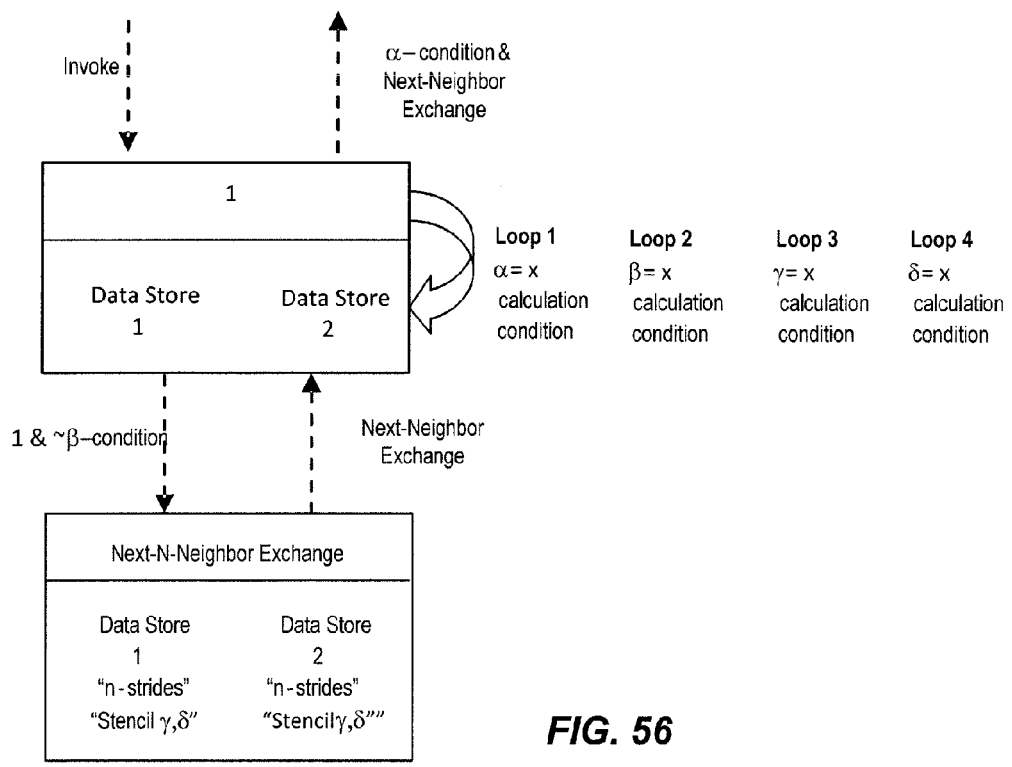
FIG. 56 shows an example of a 2-dimensional matrix with 2-dimensional stencil for 2-d next-n-neighbor exchange—with stride, finite state machine view.

FIG. 56 shows a 2-dimensional matrix with 2-dimensional stencil for 2-d next-n-neighbor exchange—with stride, in finite state machine view. Since B cannot change (depicted by the lack of an accent mark) and has the same number of dimensions as A', it is assumed to be a stencil. Note that the stencil must be smaller than the processed vector or matrix in every dimension; otherwise, it is considered a non-stenciled matrix operation, and the next-n-matrix does not apply.

Field Use Model

Concept: A field affects everything at once so if the field is distributed over multiple nodes then everything must communicate with everything.

Use: Modeling physical phenomenon.
Example Use: Gravity modeling.
Parallel Issue: Information exchange.
Action: Determine what to cross communicate.
Action Example: Perform an all-to-all exchange of data.

Figure 57:
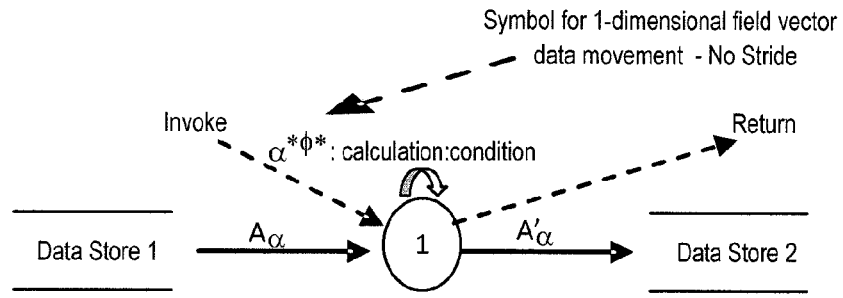
FIG. 57 shows an example of a 1-dimensional all-to-all exchange symbol—no stride, functional decomposition view.
Figure 58:
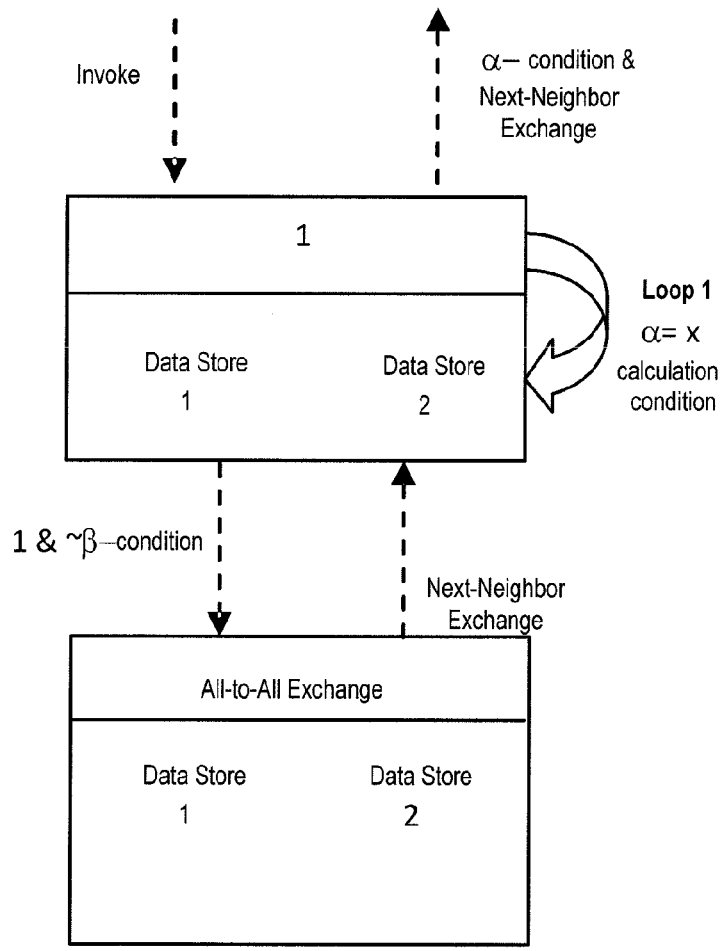
FIG. 58 shows an example of a 1-dimensional all-to-all exchange—no stride, finite state machine view.
Figure 59:
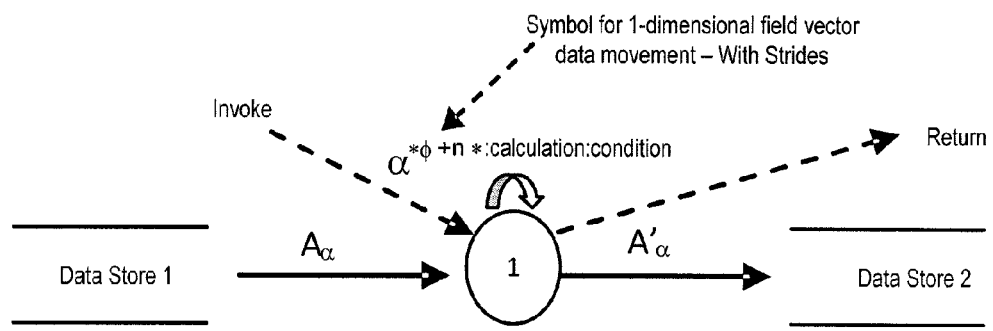
FIG. 59 shows an example of a 1-dimensional all-to-all exchange symbol—with stride, functional decomposition view.
Figure 60:
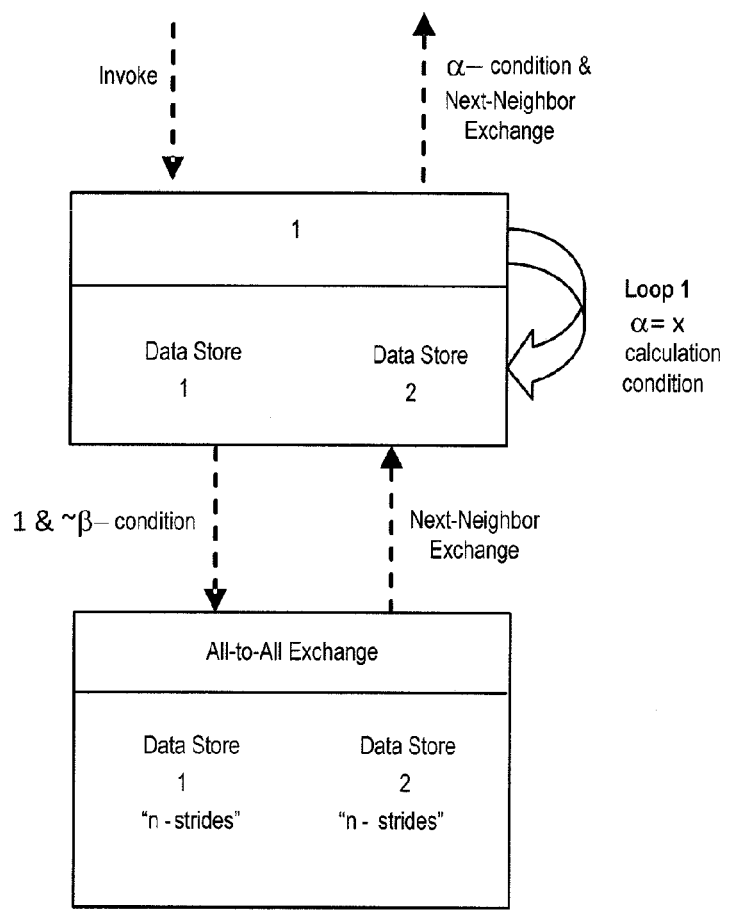
FIG. 60 shows an example of a 1-dimensional all-to-all exchange—with stride, finite state machine view.

FIG. 57 shows a 1-dimensional all-to-all exchange symbol—no stride, in functional decomposition view; FIG. 58 shows a 1-dimensional all-to-all exchange—no stride, in finite state machine view; FIG. 59 shows a 1-dimensional all-to-all exchange symbol—with stride, in functional decomposition view; FIG. 60 shows a 1-dimensional all-to-all exchange—with stride, in finite state machine view; and If a one-dimensional vector is used to depict a field then the symbol shown in FIG. 57 is used.

Figure 61:
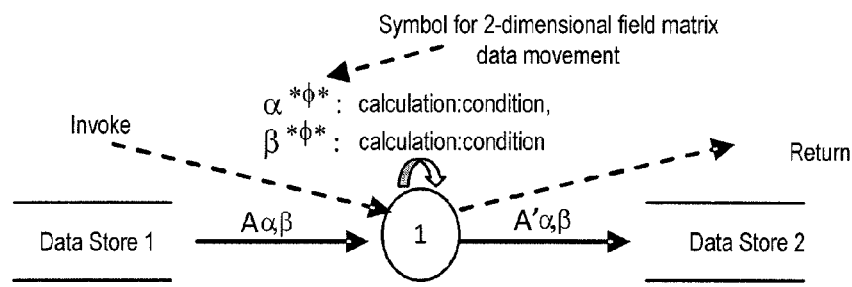
FIG. 61 shows an example of a 2-dimensional all-to-all exchange symbol—no stride, functional decomposition view.
Figure 62:
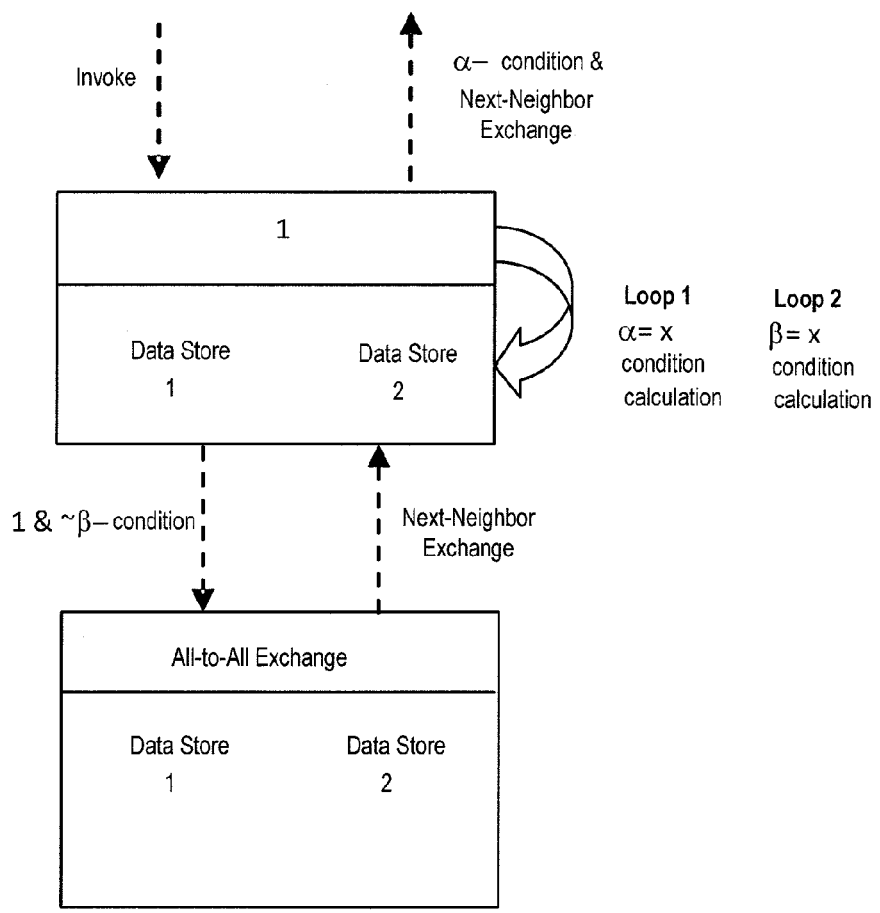
FIG. 62 shows an example of a 2-dimensional all-to-all exchange—no stride, finite state machine view.
Figure 63:
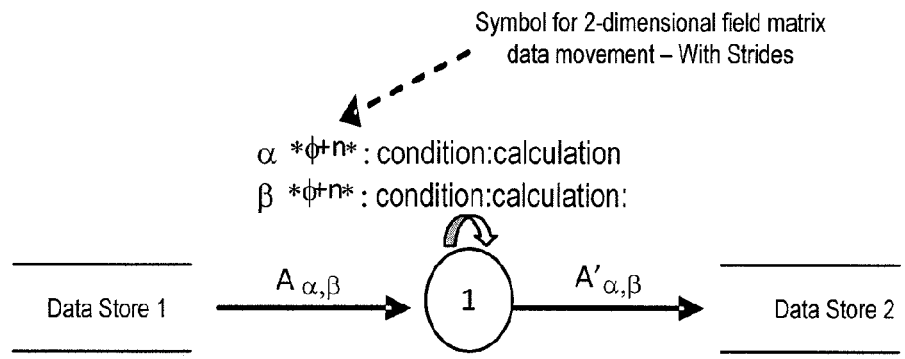
FIG. 63 shows an example of a 2-dimensional all-to-all exchange symbol—with stride, functional decomposition view.
Figure 64:
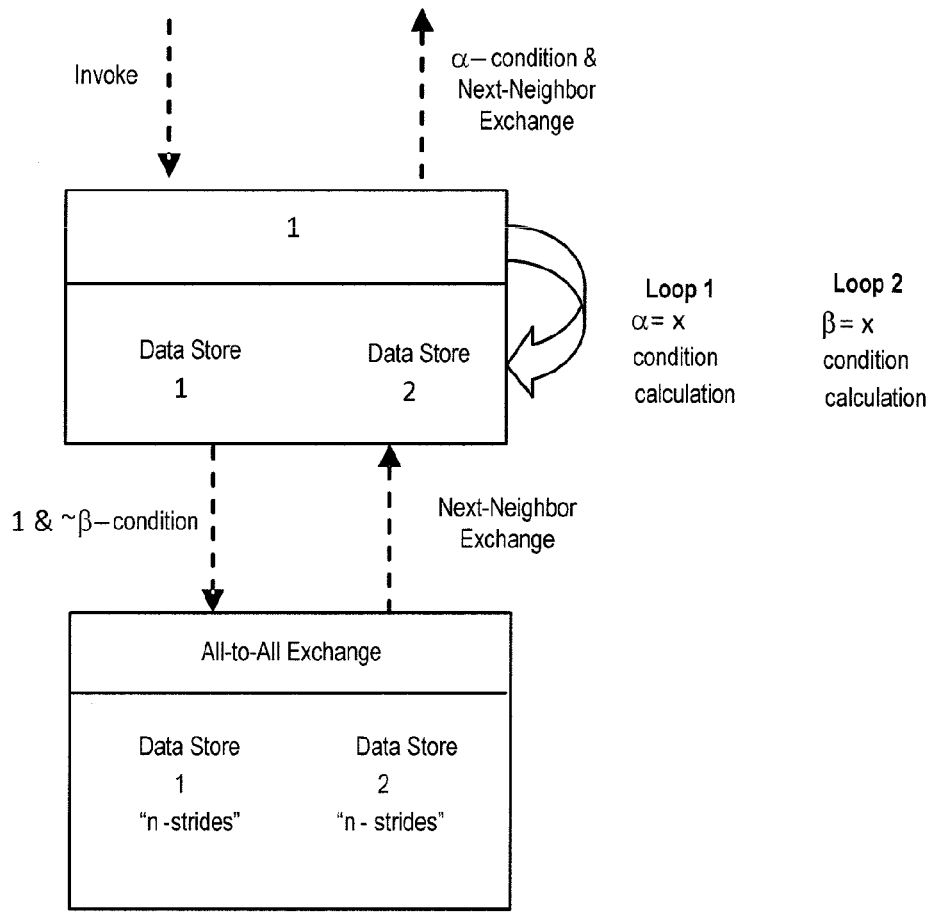
FIG. 64 shows an example of a 2-dimensional all-to-all—with stride, finite state machine view.

FIG. 61 shows a 2-dimensional all-to-all exchange symbol—no stride, in functional decomposition view; FIG. 62 shows a 2-dimensional all-to-all exchange—no stride, in finite state machine view; FIG. 63 shows a 2-dimensional all-to-all exchange symbol—with stride, in functional decomposition view figure; and FIG. 64 shows a 2-dimensional all-to-all—with stride, IN finite state machine view. If a two-dimensional matrix is used to depict fields then the symbol shown in FIG. 61 is used.

Figure 65:
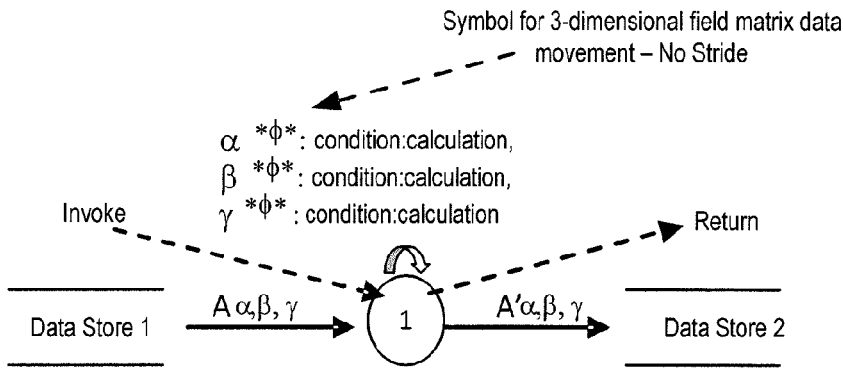
FIG. 65 shows an example of a 3-dimensional all-to-all exchange symbol—no stride, functional decomposition view.
Figure 66:
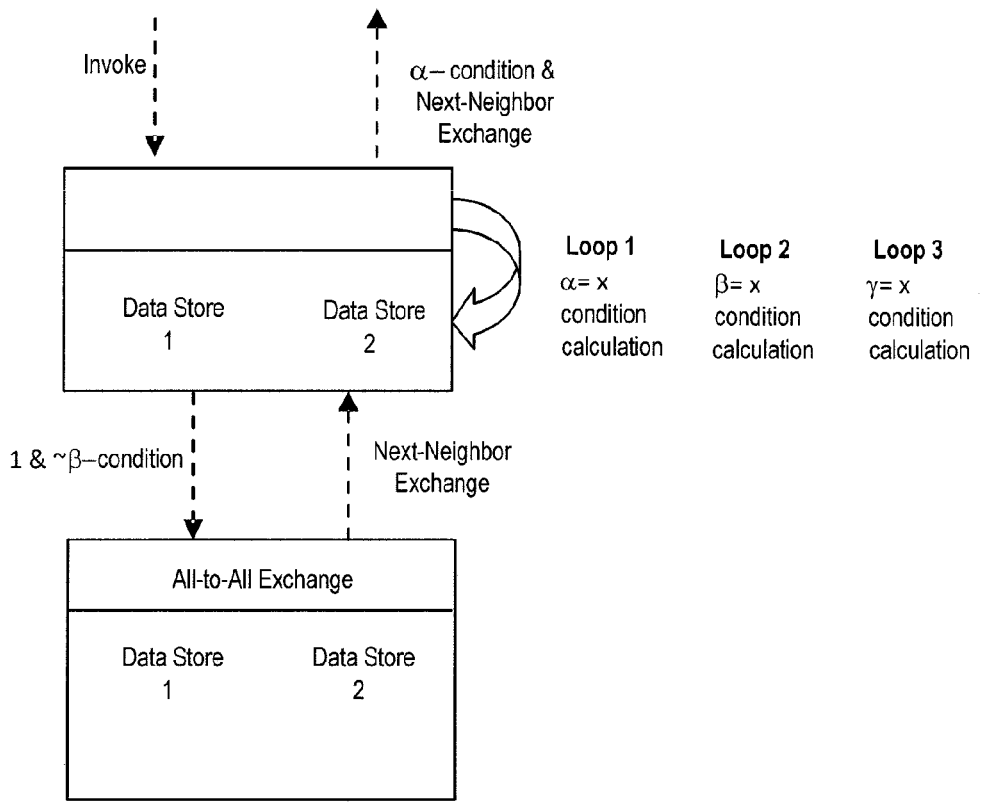
FIG. 66 shows an example of a 3-dimensional all-to-all exchange—no stride, finite state machine view.
Figure 67:
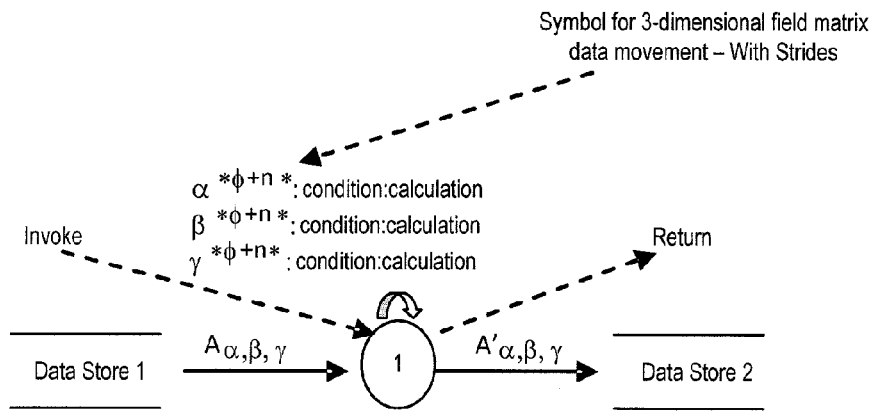
FIG. 67 shows an example of a 3-dimensional all-to-all exchange symbol—with stride, functional decomposition view.
Figure 68:
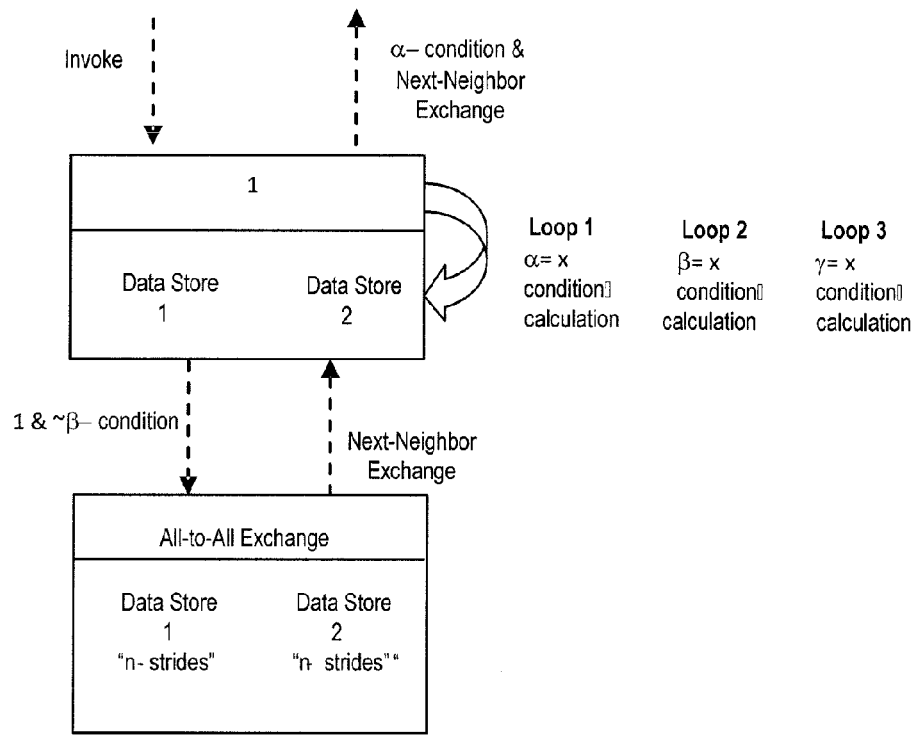
FIG. 68 shows an example of a 3-dimensional all-to-all exchange—with stride, finite state machine view.

FIG. 65 shows a 3-dimensional all-to-all exchange symbol—no stride, in functional decomposition view; FIG. 66 shows a 3-dimensional all-to-all exchange—no stride, in finite state machine view; FIG. 67 shows a 3-dimensional all-to-all exchange symbol—with stride, in functional decomposition view; and FIG. 68 shows a 3-dimensional all-to-all exchange—with stride, in finite state machine view. If a three-dimensional matrix is used to depict fields then the symbol shown in FIG. 65 is used.

Certain changes may be made in the above methods and systems without departing from the scope of that which is described herein. It is to be noted that all matter contained in the above description or shown in the accompanying drawings is to be interpreted as illustrative and not in a limiting sense. The elements and steps shown in the present drawings may be modified in accordance with the methods described herein, and the steps shown therein may be sequenced in other configurations without departing from the spirit of the system thus described. The following claims are intended to cover all generic and specific features described herein, as well as all statements of the scope of the present method, system and structure, which, as a matter of language, might be said to fall there between.

What is claimed is:

1. A method for performing functional decomposition of a software design to generate a computer-executable finite state machine, the method comprising:

decomposing functions in the software design into data transformations and control transformations repetitively until each of the decomposed data transformations consists of a respective linear code block;

wherein the data transformations accept and generate data, and the control transformations evaluate conditions and send and receive control indications to and from associated instances of the data transformations;

converting the software design to a graphical diagram including a plurality of graphical symbols interconnected to hierarchically represent the data transformations and the control transformations in the software design, wherein:

a first type of the graphical symbols comprise bubble symbols indicating functional decomposition elements within the software design, and a second type of the graphical symbols comprise control flow indicators between the functions, which indicators have transformation-selection conditions associated therewith; and the bubble symbols include control bubbles and process bubbles, wherein the control bubbles indicate the control transformations, and the process bubbles indicate the data transformations;

translating the data transformations and the control transformations into states in the finite state machine, wherein, at a given decomposition level, the first state is one of the control transformations and subsequent states each comprise a decomposed said linear code block with no control structure;

translating the transformation-selection conditions associated with the control transformations into state transitions in the finite state machine;

wherein the translating steps are performed by a computer system; and generating the finite state machine by performing steps comprising:

comparing successive decomposition levels to determine if lower-level process bubbles are associated or un-associated, wherein the process bubbles are associated if one of the control bubbles links together a pair of the process bubbles, otherwise the process bubbles are unassociated, wherein for each of the lower level process bubbles that are associated: (i) the single control bubble that associates the process bubbles of level x forms the first state on the finite state machine of level (x+1), (ii) each of the control bubbles at level x is translated into a state transition vector of the finite state machine of level (x+1); and (iii) each of the process bubbles of the next lower decomposition level is translated into a state of the of the finite state machine of level (x+1);

if any of the process bubbles of level x are unassociated, then: (i) decomposing any non-recursively defined process bubble into a decomposed process bubble of level (x+1); and (ii) wherein decomposition is complete when a level (x+1) decomposition consists of un-associated process bubbles.

2. The method of claim 1, wherein the graphical diagram includes a looping structure which is indicated, by an arrow symbol, as being associated with one of the data transformations.

3. The method of claim 1, wherein each of the functions thus decomposed receives an execution-stream identifier representing a corresponding program thread.

4. The method of claim 1, wherein the finite state machine is an executable program constructed from the linear code blocks resulting from the transformations, and the transformation-selection conditions are the state transitions constructed from the control flow as determined from the control bubbles.

5. The method of claim 1, wherein the data transformations accept and generate data using at least one input and one output variable, and the control transformations include only transitions with no associated code blocks.

6. The method of claim 1, wherein the control transformations include a non-event control item comprising a condition that changes the sequence of execution of program logic within the software design.

7. The method of claim 6, wherein each said non-event control item is selected from the list consisting of if-then-else, go to, function calls, and function returns.

8. The method of claim 1, wherein each of the control flow indicators comprises a function-order arrow and an associated condition constituting a regular conditional expression.

9. The method of claim 1, wherein data is passed only to a data transformation via a data store.

10. The method of claim 1, wherein the decomposition ends when none of the data transformations can be decomposed into a set of data transformations grouped together with a control transformation.

11. The method of claim 1, wherein the decomposition ends when the decomposition results in the same graph as the decomposed transformation.

12. The method of claim 1, wherein:

only one said control bubble exists at each decomposition level;

each said process bubble is invoked by a control bubble;

each said process bubble transmits and receives data from a data store via a data flow;

each said control bubble receives and uses data as part of determining which said process bubble is to be called; and each said process bubble returns control to its calling control bubble.

13. The method of claim 1, wherein processing parallelism is determined by associating, with input data of a transformation, data intent information indicating an intended use of the data, by indicating one of:

(1) particle-like usage wherein the data represents particles that move throughout a matrix, (2) field-like usage wherein a force affects data across a large section of the matrix simultaneously;

(3) search-like usage wherein data interacts with a larger set of data, giving some result, and (4) series expansions/contractions wherein calculation of the terms of a mathematical series is performed.

14. The method of claim 1, wherein inputs and outputs to/from terminator blocks indicate, by inclusion of a matrix index designator, that data for a matrix is being transmitted via separate, parallel data lines.

15. The method of claim 1, wherein processing topology is determined by associating, with input data of a transformation, information indicating the preferred topology for executing the finite state machine.

16. The method of claim 1, wherein processing parallelism is determined by associating, with input data of a transformation, data intent information indicating an intended use of the data.

17. A method for performing functional decomposition of a software design to generate a computer-executable finite state machine, the method comprising:

receiving the software design in the form of a graphical diagram including a plurality of graphical symbols interconnected to hierarchically represent the data transformations and the control transformations in the software design, wherein:

the software design is in a form wherein functions in the software design are repetitively decomposed into data transformations and control transformations until each of the data transformations consists of a respective linear code block; wherein the data transformations accept and generate data, and the control transformations evaluate conditions and send and receive control indications to and from the data transformations;

a first type of the graphical symbols comprise bubble symbols indicating functional decomposition elements within the software design, a second type of the graphical symbols comprise control flow indicators between the functions, which indicators have transformation-selection conditions associated therewith; and the bubble symbols include control bubbles and process bubbles, wherein the control bubbles indicate the control transformations, and the process bubbles indicate the data transformations;

translating the data transformations and the control transformations into states in the finite state machine, wherein, at a given decomposition level, the first state is one of the control transformations and subsequent states each comprise a decomposed said linear code block with no control structure;

translating the transformation-selection conditions associated with the control transformations into state transitions in the finite state machine;

wherein the translating steps are performed by a computer system; and generating the finite state machine by performing steps comprising:

comparing successive decomposition levels to determine if lower-level process bubbles are associated or un-associated, wherein the process bubbles are associated if one of the control bubbles links together a pair of the process bubbles, otherwise the process bubbles are unassociated, wherein for each of the lower level process bubbles that are associated: (i) the single control bubble that associates the process bubbles of level x forms the first state on the finite state machine of level (x+1), (ii) each of the control bubbles at level x is translated into a state transition vector of the finite state machine of level (x+1); and (iii) each of the process bubbles of the next lower decomposition level is translated into a state of the of the finite state machine of level (x+1);

if any of the process bubbles of level x are unassociated, then: (i) decomposing any non-recursively defined process bubble into a decomposed process bubble of level (x+1); and (ii) wherein decomposition is complete when a level (x+1) decomposition consists of un-associated process bubbles.

18. The method of claim 17, wherein the graphical diagram includes a looping structure which is indicated, by an arrow symbol, as being associated with one of the data transformations.

19. The method of claim 17, wherein each of the functions thus decomposed receives an execution-stream identifier representing a corresponding program thread.

20. The method of claim 17, wherein the finite state machine is an executable program constructed from the linear code blocks resulting from the transformations, and the transformation-selection conditions are the state transitions constructed from the control flow as determined from the control bubbles.

21. The method of claim 17, wherein the data transformations accept and generate data using at least one input and one output variable, and the control transformations include only transitions with no associated code blocks.

22. The method of claim 17, wherein the control transformations include a non-event control item comprising a condition that changes the sequence of execution of program logic within the software design.

23. The method of claim 22, wherein each said non-event control item is selected from the list consisting of if-then-else, go to, function calls, and function returns.

24. The method of claim 17, wherein each of the control flow indicators comprises a function-order arrow and an associated condition constituting a regular conditional expression.

25. The method of claim 17, wherein data is passed only to a data transformation via a data store.

26. The method of claim 17, wherein the decomposition ends when none of the data transformations can be decomposed into a set of data transformations grouped together with a control transformation.

27. The method of claim 17, wherein the decomposition ends when the decomposition results in the same graph as the decomposed transformation.

28. The method of claim 17, wherein:

only one said control bubble exists at each decomposition level;

each said process bubble is invoked by a control bubble;

each said process bubble transmits and receives data from a data store via a data flow;

each said control bubble receives and uses data as part of determining which said process bubble is to be called; and each said process bubble returns control to its calling control bubble.

29. The method of claim 17, wherein processing parallelism is determined in part by associating, with input data of a transformation, data intent information indicating an intended use of the data, by indicating of one of:

(1) particle-like usage wherein the data represents particles that move throughout a matrix, (2) field-like usage wherein a force affects data across a large section of the matrix simultaneously;

(3) search-like usage wherein data interacts with a larger set of data, giving some result, and (4) series expansions/contractions wherein calculation of the terms of a mathematical series is performed.

30. The method of claim 17, wherein inputs and outputs to/from terminator blocks indicate, by inclusion of a matrix index designator, that data for a matrix is being transmitted via separate, parallel data lines.

31. The method of claim 17, wherein processing topology is determined by associating, with input data of a transformation, information indicating the preferred topology for executing the finite state machine.

32. The method of claim 17, wherein processing parallelism is determined by associating, with input data of a transformation, data intent information indicating an intended use of the data.

33. A method for performing functional decomposition of a software design to generate a computer-executable finite state machine, the method comprising:
- receiving the software design in a form wherein:
  - functions in the software design are repetitively decomposed into data transformations, each represented by process bubbles, that accept and generate data, and control transformations, each represented by control bubbles, that evaluate conditions and send and receive control indications to and from the data transformations; and
  - control flow indicators are included between the functions, which indicators have transformation-selection conditions associated therewith;
- translating the data transformations and the control transformations into states in the finite state machine, wherein, at a given decomposition level, the first said state is one of the control transformations and subsequent said states each comprise a decomposed said linear code block with no control structure;
- translating the transformation-selection conditions associated with the control transformations into state transitions in the finite state machine; and
- generating the finite state machine by performing steps comprising;
  - comparing successive decomposition levels to determine if lower-level process bubbles are associated or un-associated, wherein the process bubbles are associated if one of the control bubbles links together a pair of the process bubbles, otherwise the process bubbles are unassociated,
  - wherein for each of the lower level process bubbles that are associated: (i) the single control bubble that associates the process bubbles of level x forms the first state on the finite state machine of level (x+1), (ii) each of the control bubbles at level x is translated into a state transition vector of the finite state machine of level (x+1); and (iii) each of the process bubbles of the next lower decomposition level is translated into a state of the of the finite state machine of level (x+1);
  - if any of the process bubbles of level x are unassociated, then: (i) decomposing any non-recursively defined process bubble into a decomposed process bubble of level (x+1); and (ii) wherein decomposition is complete when a level (x+1) decomposition consists of un-associated process bubbles.

34. The method of claim 33, wherein the graphical diagram includes a looping structure which is indicated, by an arrow symbol, as being associated with one of the data transformations.

35. The method of claim 33, wherein each of the functions thus decomposed receives an execution-stream identifier representing a corresponding program thread.

36. The method of claim 33, wherein the finite state machine is an executable program constructed from the linear code blocks resulting from the transformations, and the transformation-selection conditions are the state transitions constructed from the control flow as determined from the control bubbles.

37. The method of claim 33, wherein the data transformations accept and generate data using at least one input and one output variable, and the control transformations include only transitions with no associated code blocks.

38. The method of claim 33, wherein the control transformations include a non-event control item comprising a condition that changes the sequence of execution of program logic within the software design.

39. The method of claim 38, wherein each said non-event control item is selected from the list consisting of if-then-else, go to, function calls, and function returns.

40. The method of claim 33, wherein each of the control flow indicators comprises a function-order arrow and an associated condition constituting a regular conditional expression.

41. The method of claim 33, wherein data is passed only to a data transformation via a data store.

42. The method of claim 33, wherein the decomposition ends when none of the data transformations can be decomposed into a set of multiple data transformations grouped together with a control transformation.

43. The method of claim 33, wherein the decomposition ends when the decomposition results in the same graph as the decomposed transformation.

44. The method of claim 33, wherein:
- only one said control bubble exists at each decomposition level;
- each said process bubble is invoked by a control bubble;
- each said process bubble transmits and receives data from a data store via a data flow;
- each said control bubble receives and uses data as part of determining which said process bubble is to be called; and
- each said process bubble returns control to its calling control bubble.

45. The method of claim 33, wherein processing parallelism is determined by associating, with input data of a transformation, data intent information indicating an intended use of the data, by indicating of one of:
- (1) particle-like usage wherein the data represents particles that move throughout a matrix,
- (2) field-like usage wherein a force affects data across a large section of the matrix simultaneously;
- (3) search-like usage wherein data interacts with a larger set of data, giving some result, and
- (4) series expansions/contractions wherein calculation of the terms of a mathematical series is performed.

46. The method of claim 33, wherein inputs and outputs to/from terminator blocks indicate, by inclusion of a matrix index designator, that data for a matrix is being transmitted via separate, parallel data lines.

47. The method of claim 33, wherein processing topology is determined by associating, with input data of a transformation, information indicating the preferred topology for executing the finite state machine.

48. The method of claim 33, wherein processing parallelism is determined by associating, with input data of a transformation, data intent information indicating an intended use of the data.

* * * * *

UNITED STATES PATENT AND TRADEMARK OFFICE
CERTIFICATE OF CORRECTION

PATENT NO. : 8,959,494 B2  
APPLICATION NO. : 13/425136  
DATED : February 17, 2015  
INVENTOR(S) : Kevin D. Howard Page 1 of 1

It is certified that error appears in the above-identified patent and that said Letters Patent is hereby corrected as shown below:

In the specification

Column 1, Lines 39 and 40, "ability better" should read --ability to better--.
Column 24, Table 18, Row 26 and 27
" (100, 20, 132)   (104, 89, 105, 24, 136)   (108, 28, 156)   (112, 32, 160) "
should read --(100, 20, 132)  (104, 89, 105, 136)  (108, 28, 156)  (112, 32, 160)--.
Column 25, Table 18, Row 10, "(209161)" should read --(209, 161)--.

In the claims

Column 27, Line 57, "of the of the" should read --of the--.
Column 29, Line 54, "of the of the" should read --of the--.
Column 31, Line 41, "of the of the" should read --of the--.

Signed and Sealed this
Thirteenth Day of October, 2015

Michelle K. Lee
*Director of the United States Patent and Trademark Office*